United States Patent
Goyal et al.

(10) Patent No.: US 8,982,363 B2
(45) Date of Patent: Mar. 17, 2015

(54) METHOD AND APPARATUS TO DETERMINE DEPTH INFORMATION FOR A SCENE OF INTEREST

(71) Applicants: Vivek K. Goyal, Cambridge, MA (US); Ghulam Ahmed Kirmani, Cambridge, MA (US)

(72) Inventors: Vivek K. Goyal, Cambridge, MA (US); Ghulam Ahmed Kirmani, Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 173 days.

(21) Appl. No.: 13/645,952

(22) Filed: Oct. 5, 2012

(65) Prior Publication Data
US 2013/0088726 A1    Apr. 11, 2013

Related U.S. Application Data

(60) Provisional application No. 61/544,500, filed on Oct. 7, 2011.

(51) Int. Cl.
| | | |
|---|---|---|
| G01S 17/89 | (2006.01) | |
| G01S 7/486 | (2006.01) | |
| G01S 17/10 | (2006.01) | |
| G01S 7/481 | (2006.01) | |

(52) U.S. Cl.
CPC ............... *G01S 17/89* (2013.01); *G01S 7/4866* (2013.01); *G01S 17/10* (2013.01); *G01S 7/4817* (2013.01)
USPC ........................................................ 356/634

(58) Field of Classification Search
CPC ......... G01S 17/89; G01S 17/42; G01S 13/89; G01S 17/023; G01S 17/66; G01S 17/88; G01B 11/026; G01C 15/002; G01N 2021/1787
USPC .......................................................... 356/634
See application file for complete search history.

(56) References Cited

U.S. PATENT DOCUMENTS

| | | | |
|---|---|---|---|
| 3,748,470 A | * | 7/1973 | Barrett .................... 250/363.01 |
| 5,162,861 A | * | 11/1992 | Tamburino et al. .......... 356/5.05 |
| 5,384,573 A | * | 1/1995 | Turpin ............................ 359/32 |
| 6,115,123 A | * | 9/2000 | Stappaerts et al. ............ 356/457 |
| 8,139,203 B2 | * | 3/2012 | Lepere et al. ................. 356/4.01 |
| 2005/0057741 A1 | * | 3/2005 | Anderson et al. ............ 356/5.01 |
| 2006/0081764 A1 | * | 4/2006 | Lee et al. .................... 250/208.1 |

(Continued)

FOREIGN PATENT DOCUMENTS

| | | |
|---|---|---|
| DE | 10 2005 028 570 A1 | 12/2006 |
| DE | 10 2008 021 465 | 11/2009 |

OTHER PUBLICATIONS

Machine English translation (Google Patent) of DE 10 2005 028 570 A1 from applicants IDS dated Mar. 25, 2013.*

(Continued)

*Primary Examiner* — Tarifur Chowdhury
*Assistant Examiner* — Jamil Ahmed
(74) *Attorney, Agent, or Firm* — Daly, Crowley, Mofford & Durkee, LLP

(57) ABSTRACT

Depth information about a scene of interest is acquired by illuminating the scene, capturing reflected light energy from the scene with one or more photodetectors, and processing resulting signals, in at least one embodiment, a pseudo-randomly generated series of spatial light modulation patterns is used to modulate the light pulses either before or after reflection.

25 Claims, 17 Drawing Sheets

(56) References Cited

U.S. PATENT DOCUMENTS

2006/0227317 A1    10/2006    Henderson et al.
2009/0250631 A1*   10/2009    Feke et al. ................. 250/459.1

OTHER PUBLICATIONS

PCT International Preliminary Report on Patentability for PCT/US2012/058924 dated Apr. 8, 2014.
Blais; "Review of 20 Years of Range Sensor Development;" National Research Council Canada; Journal of Electronic Imaging; 13(1); Jan. 2004; 15 pages.
Blu, et al.; "Sparse Sampling of Signal Innovations;" IEEE Signal Processing Magazine; Mar. 2008; 10 pages.
Carlsson, et al.; "Three-dimensional microscopy using a confocal laser scanning microscope;" Optics Letters; vol. 10, No. 2; Feb. 1985; pp. 53-55.
Candes, et al.; "Near-Optimal Signal Recovery From Random Projections: Universal Encoding Strategies;" IEEE Transactions on Information Theory; vol. 52, No. 12; Dec. 2006; pp. 5406-5425.
Colaco, et al.; "CoDAC: Compressive Depth Acquistion using a Single Time-Resolved Sensor;" Proc. ACM; SIGGRAPH 2012; Aug. 2012, 1 page.
Colaco, et al.; "Compressive Depth Map Acquisition Using a Single Photo-Counting Detector: Parametric Signal Processing Meets Sparsity;" Proc. IEEE Conf. Computer Vision and Pattern Recognition; Jun. 2012; pp. 96-102.
Donoho; "Compressed Sensing;" IEEE Transactions on Information Theory; vol. 52, No. 4; Apr. 2006; pp. 1289-1306.
Dragotti, et al.; "Sampling Moments and Reconstruction Signals of Finite Rate of Innovation: Shannon Meets Strang-Fix;" IEEE Transactions on Signal Processing; vol. 55, No. 5; May 2007; pp. 1741-1757.
Duarte, et al.; "Single-Pixel Imaging via Compressive Sampling;" IEEE Signal Processing Magazine; Mar. 2008; pp. 83-91.
Foix, et al.; "Lock-in Time-of-Flight (ToF) Cameras: A Survey;" IEEE Sensors Journal; vol. 11, No. 9; Sep. 2001; pp. 1917-1926.
Gokturk, et al.; "A Time-Of-Flight Depth Sensor—System Description, Issues and Solutions;" IEEE Computer Society Conference on Computer Vision ad Pattern Recognition Workshops; Jan. 2004; 9 pages.
Grant, et al.; "Graph Implementations for Nonsmooth Convex Programs;" LNCIS 371; Jan. 2008; pp. 95-110.
Howland, et al.; "Compressive Sensing LIDAR for 3D Imaging;" 2011 Conference on Lasers and Electric Optics (CLEO); May 2011; 2 pages.
Hussmann, et al.; "A Performance Review of 3D TOF Vision Systems in Comparison to Stereo Vision Systems;" Open Access Database, www.i-techonline.com; Stereo Vision; Nov. 2008; 18 pages; http://www.intechopen.com/books/stereo_vision/a_performance_review_of_3d_tof_vision_systems_in_comparison_to_stereo_vision_systems.
Kirmani, et al.; "CoDAC: Compressive Depth Acquisition Camera Capturing high resolution scene depth with a single sensor;" Presentation at Qualcomm Technologies; Bridgewater, NJ; Apr. 19, 2011; 12 pages.
Kirmani, et al.; "CODAC: A Compressive Depth Acquisition Camera Framework;" Proc. IEEE Int. Conf. Acoustics, Speech, and Signal Processing (ICASSP); Jan. 2012; pp. 5425-5428.
Kirmani, et al.; "Exploiting sparsity in time-of-flight range acquisition using a single time-resolved sensor;" Optics Express; vol. 19, No. 22; Oct. 24, 2011; pp. 21485-21507.
Lamb, et al.; "Single-pixel imaging using 3D scanning time-of-flight photon counting;" SPIR; Newsroom; Jan. 2010; 3 pages.
Medina, et al.; "Compact laser radar and three-dimensional camera;" J. Opt. Soc. Am. A/vol. 23, No. 4; Apr. 2006; pp. 800-805.
Sarkis, et al.; "Depth Map Compression Via Compressed Sensing;" IEEE; ICIP; Jan. 2009; pp. 737-740.
Scharstein, et al.; "A Taxonomy and Evaluation of Dense Two-Frame Stereo Correspondence Algorithms;" International Journal of Computer Vision; 47(1/2/3); Jan. 2002; pp. 7-42.
Schuon, et al.; "High-Quality Scanning Using Time-Of-Flight Depth Superresolution;" IEEE: Jan. 2008; 7 pages.
Schwarz; "Mapping the world in 3D;" Nature Photonics; vol. 4; Jul. 2010; pp. 429-430.
Seitz, et al.; "A Comparison and Evaluation of Multi-View Stereo Reconstruction Algorithiums;" IEEE Computer Conference on Vision and Pattern Recognition; Jan. 2006; 8 pages.
Sharpe, et al.; "Optical Projection Tomography as a Tool for 3D Microscopy and Gene Expression Studies;" Science AAAS; vol. 296; Apr. 19, 2002; pp. 541-545.
Stoykova, et al.; "3-D Time-Varying Scene Capture Technologies—A Survey;" IEEE Transactions on Circuits and Systems for Video Technology; vol. 17, No. 11; Nov. 2007; pp. 1568-1586.
Tosic, et al.; "Leaving Sparse Representations of Depth;" IEEE Journal of Selected Topics in Signal Processing; vol. 5, No. 5; Sep. 2011; pp. 941-952.
Vetterli, et al; "Sampling Signals With Finite Rate of Innovation;" IEEE Transactions on Signal Processing; vol. 50; No. 6; Jun. 2002; pp. 1417-1428.
Wakin, et al.; An Architecture for Compressive Imaging; IEEE; Inter. Conf. on Image Processing (ICIP); Jan. 2006; pp. 1273-1276.
Wehr, et al.; "Airborne laser scanning—an introduction and overview;" ISPRF Journal of Photogrammetry & Remote Sensing 54; Jan. 1999; pp. 68-82.
Bretar, et al.; "Managing Full Waveform Lidar Data: A Challenging Task For the Forthcoming Years;" ISPRS Archives; vol. XXXVII Part B1; XXIst ISPRS Congress; Jul. 3, 2008; pp. 415-420.
Parrish, et al; "Empirical Comparison of Full-Waveform Lidar Algorithms: Range Extraction and Discrimination Performance;" Photogrammetric Engineering and Remote Sensing; vol. 77; No. 8; Aug. 1, 2011; pp. 825-838.
Zhu, et al.; "Application Of The Deconvolution Method In The Processing Of Full-Waveform Lidar Data;" Image and Signal Processing (CISP); $3_{rd}$ International Congress on IEEE; Oct. 16, 2010; pp. 2975-2979.
PCT Search Report of the ISA for PCT/US2012/058924 dated Jan. 22, 2013.
Written Opinion of the ISA for PCT/US2012/058924 dated Jan. 22, 2013.

* cited by examiner $r(t) = h(t) * \mathsf{P}(t, T_0, T_\phi \Delta\phi, T_\theta \Delta\theta)$

METHOD AND APPARATUS TO DETERMINE DEPTH INFORMATION FOR A SCENE OF INTEREST

RELATED APPLICATIONS

This application claims the benefit of U.S. Provisional Application No. 61/544,500 filed Oct. 7, 2011 under 35 U.S.C. §119(e) which application is hereby incorporated herein by reference in its entirety.

GOVERNMENT RIGHTS

This work was supported by the National Science Foundation under Contract No. CCF-0643836. The Government has certain rights in this invention.

FIELD

Subject matter disclosed herein relates generally to imaging and, more particularly, to techniques for three dimensional scene acquisition.

BACKGROUND

Sensing three dimensional (3D) scene structure is an integral part of applications ranging from 3D microscopy to geographical surveying. While two dimensional (2D) imaging is a mature technology, 3D acquisition techniques have room for significant improvements in spatial resolution, range accuracy, and cost effectiveness. Humans use both monocular cues, such as motion parallax, and binocular cues, such as stereo disparity, to perceive depth, but camera-based stereo vision techniques suffer from poor range resolution and high sensitivity to noise. Computer vision techniques (including structured-light scanning, depth-from-focus, depth-from-shape, and depth-from-motion) are computation intensive, and the range output from these methods is highly prone to errors from miscalibration, absence of sufficient scene texture, and low signal-to-noise ratio (SNR).

In comparison, active range acquisition systems, such as light detection and ranging (LIDAR) systems and time of flight (TOF) cameras, are more robust against noise, work in real-time at video frame rates, and acquire range information from a single viewpoint with little dependence on scene reflectance or texture. Both LIDAR and TOF cameras operate by measuring the time elapsed between transmitting a pulse and sensing a reflection from the scene. LIDAR systems consist of a pulsed illumination source such as a laser, a mechanical 2D laser scanning unit, and a single time-resolved photodetector or avalanche photodiode. A TOF camera illumination unit is composed of an array of omnidirectional, modulated, infrared light emitting diodes (LEDs). The reflected light from the scene, with time delay proportional to distance, is focused at a 2D array of TOF range sensing pixels.

A major shortcoming of LIDAR systems and TOF cameras is low spatial resolution, or the inability to resolve sharp spatial features in the scene. For real-time operability, LIDAR devices have low 2D scanning resolution. Similarly, due to limitations in the 2D TOF sensor array fabrication process and readout rates, the number of pixels in commercially-available TOF camera sensors is currently limited to a maximum of 320×240 pixels. Consequently, it is desirable to develop novel, real-time range sensors that possess high spatial resolution without increasing the device cost and complexity.

SUMMARY

Techniques, systems, and devices are provided herein that are capable of capturing depth information for a three dimensional scene of interest in an efficient and cost effective manner. In some implementations, spatial light modulation is used to either modulate a series of light pulses transmitted toward the scene of interest or modulate the light reflected by the scene before it is incident on a time-resolved sensor. Light energy reflected from the scene of interest is then captured in one or more time-resolved or time-sampling detectors and digitized. The resulting digital data may then be processed using parametric signal deconvolution to generate a range profile about the scene of interest. The one-dimensional range profile of a scene is a combined indicator of how much scene content is present at a particular depth and how much of it was illuminated or rejected by the spatial modulation pattern. The range profile corresponding to different spatial patterns may then be further processed using spatial recovery techniques, for example convex optimization, to generate a two-dimensional depth map for the scene of interest. In one embodiment it was determined that the depth map of a typical natural scene has a Laplacian that is sparse; more generally the depth map of a scene may be approximated well using only a small number of values in an appropriately chosen transform domain, like a discrete cosine transform or wavelet transform. The techniques provided herein may take advantage of this sparsity in recovery of the depth map of a scene from the digital samples of the light reflected from the scene.

Before other digital processing is performed, time-sampled digital data corresponding to one (or more) of the transmitted light pulses and spatial modulation patterns may be processed using signal deconvolution, including parametric methods, to determine a depth or range profile associated with the scene of interest. The depth or range profile information may then be used during the subsequent digital processing to extract scene ranges of interest from the digital samples. In at least one embodiment, a single light pulse that is either spatially unmodulated (omnidirectional) or modulated with a fully transparent spatial light modulation (SLM) pattern is used to determine the overall range profile of the scene without transverse spatial resolution.

In various implementations, the techniques, systems, and devices of the present disclosure may provide many benefits over conventional range/depth acquisition techniques. For example, the techniques, systems, and devices are capable of providing better spatial resolution in the resulting depth maps than would be expected for the number of light sensors being used (i.e., the spatial information is "compressed" within the detected light information). In some embodiments, for example, a single light sensor may be used. In addition, in some implementations, enhanced depth/temporal resolution may be achieved relative to the speed/bandwidth of the detector(s) used even when the spatial information is mixed at single photodetector. The disclosed techniques, systems, and devices are also capable of being implemented in a manner that consumes very little power relative to more conventional depth acquisition schemes. For example, because fewer and simpler circuit elements may be used in different implementations (e.g., light sources, light detectors, etc.), power consumption may be kept to a minimum.

In addition to the above, the disclosed techniques, systems, and devices are also capable of minimizing the negative effects of ambient light. This is because the techniques typically utilize the entire time profile for image processing, which allows low frequency components (associated with background illumination) to be rejected. As is well known, background light presents a problem in many conventional depth acquisition techniques. Based on some or all of the above described benefits, the techniques, systems, and devices of the present disclosure are well suited for use in applications having limited energy availability (e.g., battery powered applications, etc.) and applications having smaller form factors (handheld devices such as, for example, cellular phones, smart phones, tablet and laptop computers, personal digital assistants, digital cameras, and others).

In accordance with one aspect of the concepts, systems, circuits, and techniques described herein, a machine implemented imaging method for generating depth information for a three dimensional scene comprises: transmitting light toward the scene; receiving reflected light at at least one detector resulting from reflection of the transmitted light from the scene; spatially modulating the light before it reaches the at least one detector using a number of different spatial modulation patterns; converting output signals of the at least one detector corresponding to different spatial modulation patterns to digital samples; processing digital samples corresponding to different spatial modulation patterns to estimate a number of scene impulse responses; and processing the scene impulse responses to generate a depth map for the scene.

In accordance with another aspect of the concepts, systems, circuits, and techniques described herein, an imaging device comprises: a light source to generate light to illuminate a three dimensional scene of interest; at least one detector to detect light reflected from the scene of interest; a spatial light modulator to modulate the light before it reaches the at least one detector using a number of different spatial modulation patterns; an analog to digital converter (ADC) to digitize output signals of the at least one detector to generate digital samples corresponding to different spatial modulation patterns; and at least one digital processor to: (i) process digital samples corresponding to different spatial modulation patterns to estimate a number of scene impulse responses; and (ii) process the scene impulse responses to generate a depth map for the scene of interest.

BRIEF DESCRIPTION OF THE DRAWINGS

The foregoing features may be more fully understood from the following description of the drawings in which.

DETAILED DESCRIPTION

Figure 1A:
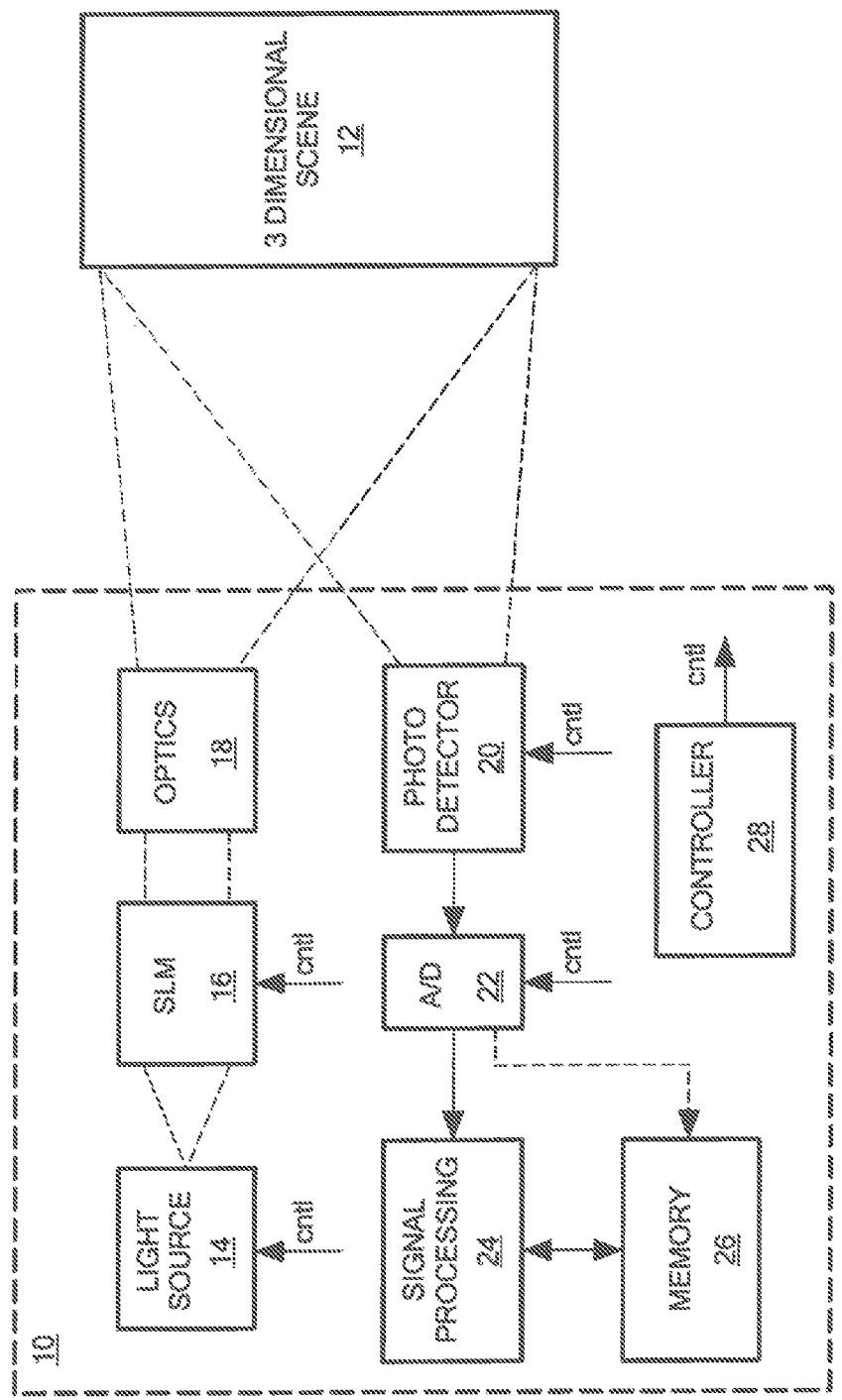
FIG. 1A is a block diagram illustrating an exemplary imaging system in which spatial modulation of transmitted light is used in accordance with an embodiment.

FIG. 1A is a block diagram illustrating an exemplary imaging system 10 in accordance with an embodiment. The imaging system 10 may be used to, for example, capture depth map information for a three dimensional scene of interest 12. The depth map information may include, for example, a two dimensional array of values corresponding to distances from system 10 to various points in the scene of interest. Such depth map information may be useful in various applications including, for example, gaming applications, security/surveillance applications, biometrics, augmented reality systems, natural and gestural user interfaces, outdoor and indoor navigation, automobile navigation, remote telepresence and conferencing systems, head mounted displays, automatic object detection, tracking and segmentation, geographical terrain mapping and medical imaging. During operation, a user may, for example, point imaging system 10 at scene of interest 12 and press an actuator or otherwise initiate a depth capture operation. Imaging system 10 may then direct light energy toward scene of interest 12 and sense light energy reflected from the scene. Imaging system 10 may process the reflected light energy to determine depth information for scene of interest 12.

In some implementations, imaging system 10 may be provided as a standalone imaging device. In other implementations, imaging system 10 may be made part of a larger system or device such as, for example, a handheld wireless communicator (e.g., a cell phone, a smart phone, a satellite communicator, a pager, a tablet computer having wireless functionality, etc.), a digital camera or camcorder, personal computers including tablets, desktops and laptops or some other electronic device including consumer electronic devices. In still other implementations, imaging system 10 may be provided as a removable unit that may be coupled to or installed within another system (e.g., a PC card inserted into a laptop computer, an imaging device that may be coupled to a port of a computer or smartphone, etc.).

As illustrated in FIG. 1A, imaging system 10 may include: a light source 14, a spatial light modulator 16, one or more optical elements 18, one or more photodetectors 20, an analog to digital converter (ADC) 22, a signal processing unit 24, a memory 26, and a controller 28. Light source 14 is operative for generating coherent or incoherent light that is used to illuminate scene of interest 12 during depth acquisition operations. The light that is generated may be in the form of light pulses or a continuous or intermittent stream of light. In the discussion that follows, it will be assumed that light pulses are being used. Spatial light modulator 16 is operative for modulating the light pulses before they reach scene of interest 12 or after they are reflected back from the scene 12. Optical element(s) 18 may be used to appropriately focus or direct the light pulses on scene of interest 12. Photodetector(s) 20 is operative for sensing light reflected from scene of interest 12 resulting from the transmitted light pulses. ADC 22 samples the output signal of photodetector(s) 20 to generate digital samples representative of the detected light energy. Light source 14 may generate light pulses one at a time. Thus, a separate set of digital samples may be generated by ADC 22 for each transmitted light pulse as well as for each spatial pattern. These digital samples may be temporarily stored within memory 26 to await further processing. Signal processing unit 24 is operative for processing some or all of the collected digital samples to generate a depth map for scene of interest 12. Signal processing unit 24 may store the generated depth map in memory 26.

Controller 28 may be used to control the operation and synchronization of some or all of the other components of system 10. Thus, for example, controller 14 may synchronize the transmission of light pulses by light source 14 with the changing of SLM patterns within spatial light modulator 16. Controller 14 may also synchronize the sampling of detected light energy by ADC 22 with the transmission of light pulses by light source 14. Controller 14 may also, in some implementations, control the storage and retrieval of digital sample data to/from memory 26 and the initiation of processing within signal processing unit 24.

In conceiving certain embodiments described herein, it was appreciated that most natural scenes may be modeled as a number of discrete planar facets with possibly some curved surfaces. As will be described in greater detail, reflected light signals from both planar facets and curved surfaces take the form of parametric signals. In contrast to general signals, parametric signals may be described using only a small number of parameters. In addition, parametric signals are generally smooth and vary in a linear manner. Thus, superposition will apply when adding parameteric signals. As will be described in greater detail, in some embodiments, signal processing unit 24 may employ, among other things, signal deconvolution techniques (e.g., parametric signal deconvolution, etc.) as part of the process to recover the depth map Information for scene of interest 12.

Light source 14 may include any type of light source that is capable of generating light of a sufficient intensity to travel round trip to and from scene 12 and still be detected by photo detector(s) 20. This may include light sources having a single or multiple light generating elements (e.g., a single laser diode, an array of laser diodes or light emitting diodes, an incandescent light source, edge emitting laser diodes, modelocked lasers etc.). In at least one implementation, a single low cost light element is used as light source 14.

Spatial light modulator 16 may include any type of modulation device that is capable of controllably modulating light traveling through the device in a spatial manner. In one approach, spatial light modulator 16 may include a two dimensional array of pixels that may be individually and controllably modified to change an amount of attenuation for light passing though the pixel. The individual pixels may be binary in nature (e.g., changed between substantially transparent and substantially opaque states) or they may have more than two individual attenuation levels (e.g., grey scale). In at least one embodiment, spatial light modulator 16 may include a micromirror array. Other types of spatial light modulators 16 may also be used including, for example, phase based light modulators and spatial modulators based on liquid crystal displays and printed masks.

Optical element(s) 18 is operative for directing the light energy towards the scene and collecting the light reflected by the scene and focusing it on the detector(s). Optical element(s) 18 may include, for example, one or more lenses or microlenses, grating, or electro mechanical and optical shutters.

Photodetector(s) 20 may include any type of device or component that is capable of detecting light energy and converting the light energy to an electrical signal. Photodetector(s) 20 may include a single light detecting element (e.g., a single photodiode or phototransistor) or multiple elements (e.g., an array of detectors). In a typical implementation, the spatial resolution of the depth map generated by system 10 will be much larger than the number of sensors of photodetector (s) 20. For instance, in one exemplary implementation, a 16×16 sensor array may be used to generate a megapixel depth map. In at least one embodiment, a single low cost sensor may be used as photodetector(s) 20.

Signal processing unit 24 may be implemented using, for example, one or more digital processing devices. The digital processing device(s) may include, for example, a general purpose microprocessor, a digital signal processor (DSP), a reduced instruction set computer (RISC), a microcontroller, an embedded controller, a field programmable gate array (FPGA), a digital logic array (DLA), an application specific integrated circuit (ASIC), and/others, including combinations of the above. In some implementations, programs and/or other configuration information may be stored within memory 26 for use in configuring signal processing unit 24. Controller 28 may also be implemented using one or more digital processing devices. Controller 28 may be implemented within the same or different digital processing devices than signal processing unit 24.

Memory 26 may include any type of system, device, or component, or combination thereof, that is capable of storing digital information (e.g., digital data, computer executable instructions and/or programs, configuration information for reconfigurable hardware, etc.) for access by signal processing unit 24 and/or other components of system 10. Memory 26 may include, for example, semiconductor memories, magnetic data storage devices, disc based storage devices, optical storage devices, read only memories (ROMs), random access memories (RAMs), non-volatile memories, flash memories, and/or others.

In at least one embodiment, processing within signal processing unit 24 may take place in two stages. In a first stage, digital samples resulting from one spatial modulation pattern (or possibly multiple patterns) may be processed using signal deconvolution to recover the range profile of scene of interest 12 (i.e., information about a lowest depth value and a highest depth value and how the scene varies as a function of range 12). In some implementations, this depth range information may be specified as a shortest light pulse transit time $T_{MIN}$ to scene 12 and a longest light pulse transit time $T_{MAX}$ to scene 12. In at least one implementation, a single unmodulated or omnidirectional light pulse modulated or a light pulse modulated using an SLID pattern may be used to generate the depth range information (although other patterns may be used in other implementations). As will be described in greater detail, an impulse response of photodetector 20 may be acquired for use in performing the signal deconvolution operation.

Figure 7A:
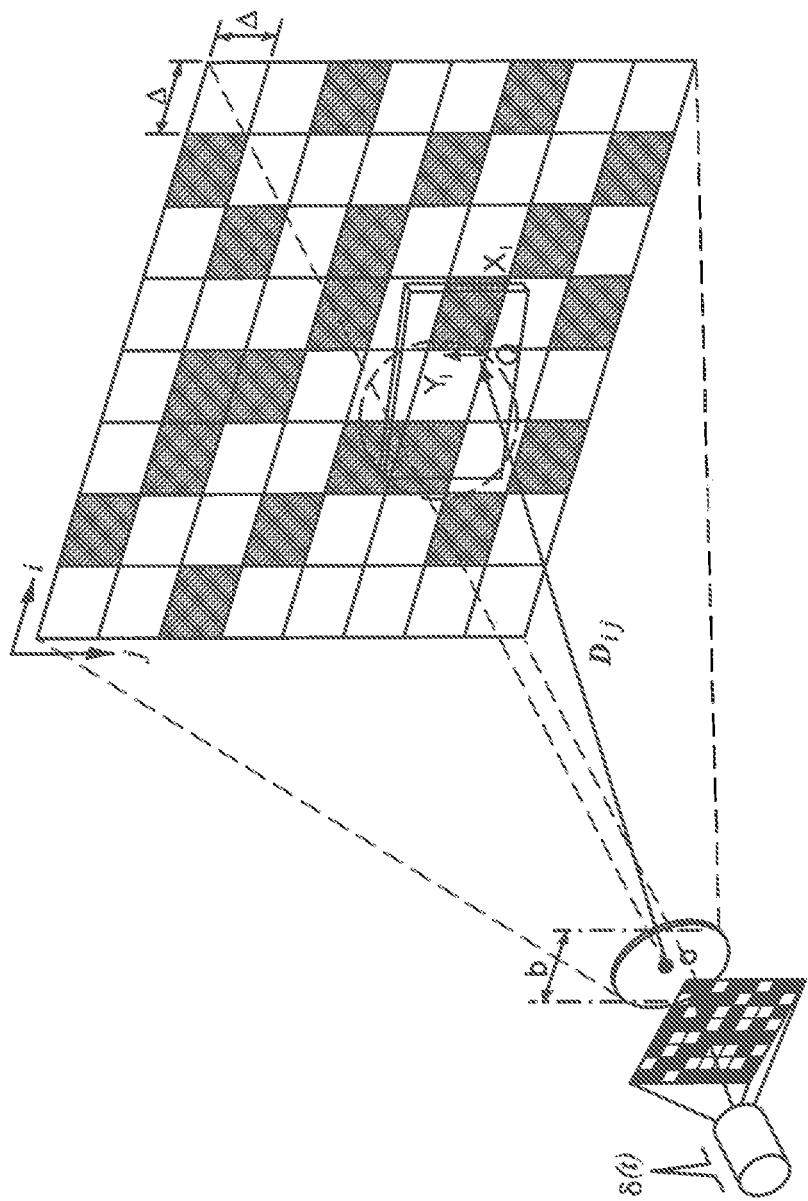
FIGS. 7A-7D are diagrams illustrating the response of a single rectangular facet of a scene of interest to a binary SLM pattern in accordance with an embodiment.
Figure 7B:
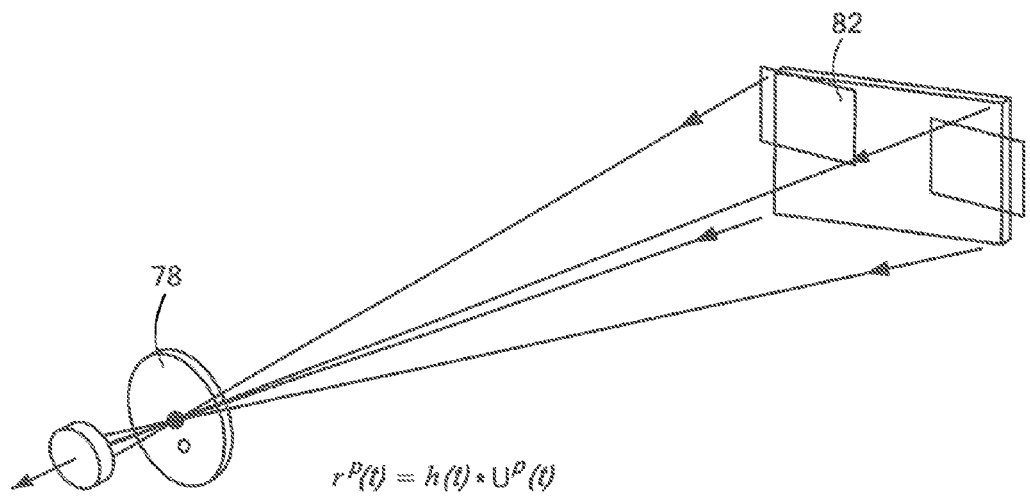
Figure 7C:
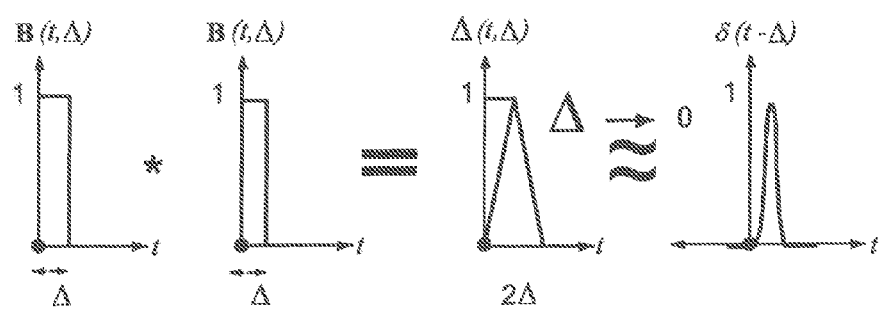
Figure 7D:
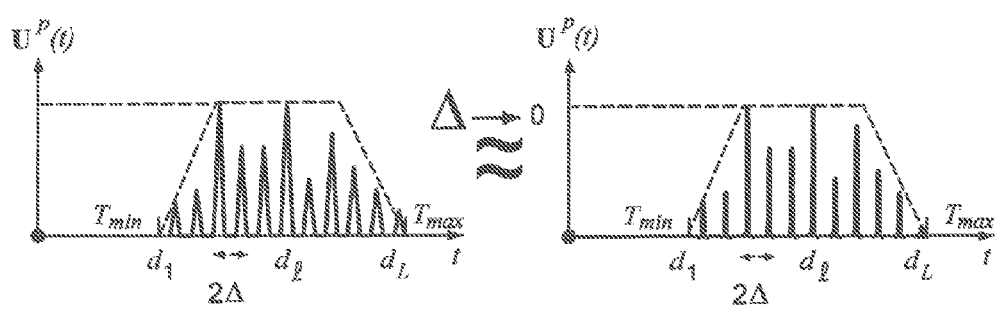

In a second processing stage, after the scene range profile has been determined, digital samples resulting from transmission of other light or light pulses may be processed along with the range profile within signal processing unit 24, using signal deconvolution, to generate range profile information corresponding to each of the different SLM spatial patterns (see FIG. 7D for an example of the scene range profile occurring between $T_{MIN}$ and $T_{MAX}$). The signal deconvolution operations will recover the temporal (or depth) resolution information of scene 12. In some embodiments, each of the light pulses that are used for the second stage of processing will have been modulated using a different SLM pattern from the other pulses. In some implementations, the SL M patterns may be pseudo-randomly generated for use in the depth acquisition procedure. Because the SLM patterns are different, the scene range profiles recovered for each of the transmitted light pulses during the second stage of processing may be different (i.e., different amplitudes variations with depth, etc.). It is this difference between the scene range profiles associated with the different modulated light pulses that carries the spatial information from which the depth map may be generated. As described above, an impulse response of photodetector 20 may be used to perform the signal deconvolution operations.

After scene range profiles have been generated for each of the modulated light pulses, the resulting digital sample information may be processed in signal processing unit 24 to recover the spatial resolution of the scene and generate the depth map. As will be described in greater detail, spatial processing techniques, for example optimization, may be used to process the scene range profiles corresponding to different spatial patterns within signal processing unit 24. As will be appreciated, in some implementations, signal processing unit 24 may process digital sample Information resulting from less than all of the light pulses transmitted toward scene of interest 12. In general, the number of spatial patterns used to recover the depth map will depend on the desired spatial resolution of the depth map. In some implementations, the number of pixels in the resulting depth map will be equal to the number of pixels in the SLM pattern utilized. In some embodiments, the number of different spatial patterns used will vary between 1% and 10% of the number of pixels in the SLM pattern.

Figure 1B:
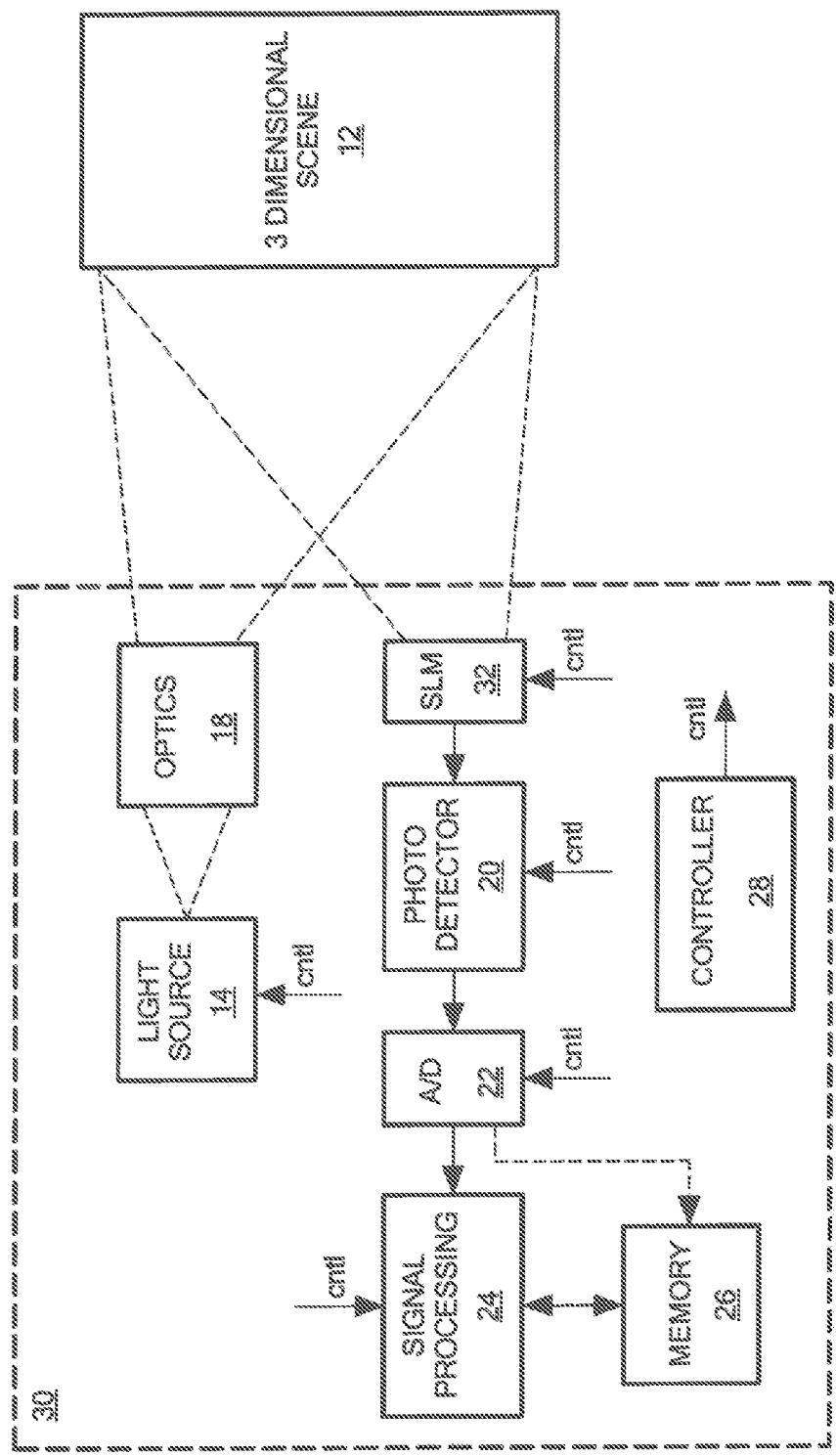
FIG. 1B is a block diagram illustrating an exemplary imaging system in which light is spatially modulated after reflection from a scene of interest in accordance with an embodiment.

In system 10 of FIG. 1A, the spatial light modulation is performed before the light signal reaches scene 12. In other embodiments, the light modulation may be performed after the light is reflected from scene 12. FIG. 1B is a block diagram Illustrating an exemplary imaging system 40 that performs light modulation after reflection in accordance with an embodiment. As illustrated, system 40 includes a spatial light modulator 32 just before photodetector(s) 20. Light source 14 illuminates scene 12 with unmodulated light. Spatial light modulator 32 then receives the light energy reflected from scene 12 and modulates the light using different SLM patterns before the light is detected by detector 20. The patterns that are used may be controlled by controller 28. As described previously, in some embodiments, controller 20 may pseudo-randomly generate the SLM patterns that are used. Other techniques for generating the SLM patterns may alternatively be used. The processing of the detected light may then proceed in substantially the same manner described previously.

Figure 2:
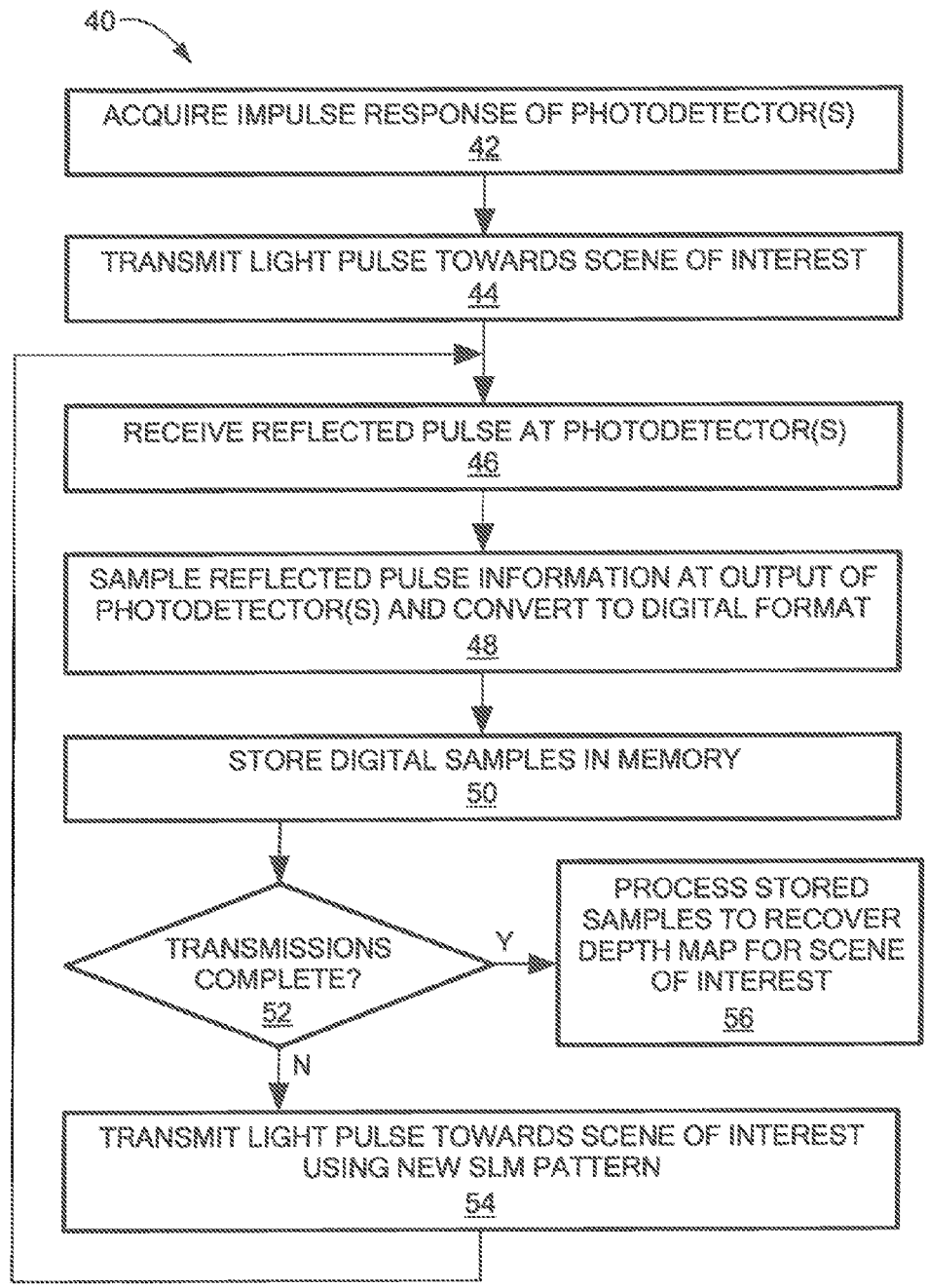
FIG. 2 is a flowchart illustrating a machine implemented method for use in recovering depth information for a scene of interest in accordance with an embodiment.

FIG. 2 is a flowchart illustrating an exemplary machine implemented method 40 for use in recovering depth information for a scene of interest in accordance with an embodiment. The method 40 may be used in connection with, for example, imaging device 10 of FIG. 1 or other similar systems. First, an impulse response of photodetector may be acquired (block 42). In one approach, the impulse response may be acquired by direct measurement by applying a light impulse to an input of the photodetector and recording a resulting response. In other approaches, the impulse response may be retrieved a memory or from some other source. A light pulse that is either unmodulated or modulated using an SLM pattern may next be transmitted toward the scene of interest (block 44). Reflected light energy resulting from reflection of the transmitted pulse from the scene of interest may then be sensed by one or more photodetectors (block 46). The output of the photodetector may then be digitized to generate digital samples associated with the transmitted pulse (block 48). The digital samples may be temporarily stored in a memory for later use (block 50).

It next may be determined whether all spatial patterns that will be used to generate the depth map have been transmitted (block 52). If not, another spatial pattern will be used to modulate the light going towards the scene of interest or light reflected back from the scene (block 54). The reflected light energy for the new SLM pattern will then be sensed, digitized and stored (blocks 46, 48, 50). This process may then be repeated until a desired number of spatial patterns have been transmitted. In at least one embodiment, the SLM patterns that are used to modulate the light pulses may be pseudo-randomly selected. In other embodiments, the same series of SLM patterns may be used for each depth map acquisition operation or the SLM patterns may be selected in another manner. After all the spatial light modulations are complete (block 52-Y), the digital sample information collected for the transmitted pulses may be processed to generate a depth map for the scene of interest (block 56).

Figure 3:
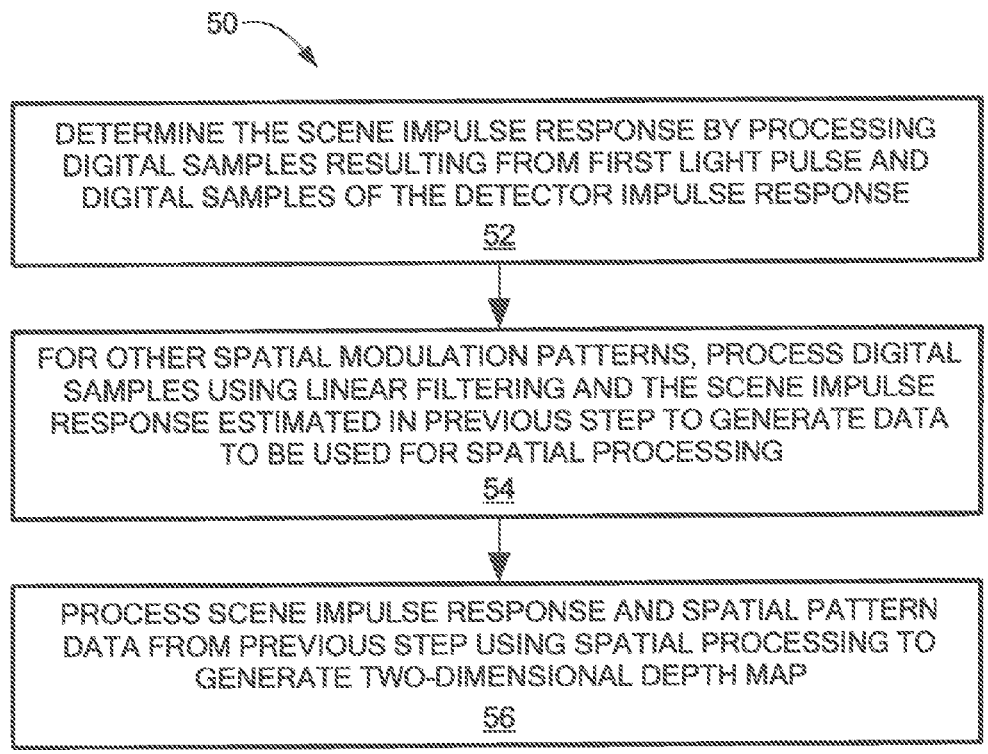
FIG. 3 is a flowchart illustrating a machine implemented method for use in processing digital sample data to generate a depth map for a scene of interest in accordance with an embodiment.

FIG. 3 is a flowchart illustrating an exemplary machine implemented method 50 for use in processing digital sample data to generate a depth map for a scene of interest in accordance with an embodiment. The method 50 may be used as part of method 40 of FIG. 2 or similar methods. Digital samples associated with a first transmitted pulse may first be processed using signal deconvolution to determine the scene range profile (block 52). In at least one embodiment, the first light pulse may be modulated or omnidirectional, or it can be modulated with an SLM pattern. As described previously, $T_{MIN}$ and $T_{MAX}$ represent a shortest light pulse transit time $T_{MIN}$ and a longest light pulse transit time $T_{MAX}$ to a corresponding scene of interest and may be used as an indication of a depth ranges present in the scene. As will be described in greater detail, to perform the signal deconvolution, the impulse response of the photodetector may be used. Although referred to above and elsewhere herein as a "first" digital pulse, it should be appreciated that this pulse does not have to be the first pulse transmitted in time. That is, the word "first" is being used here to identify the pulse and not to signify a temporal relationship.

After the range profile has been determined, the digital samples associated with the other transmitted pulses (along with the impulse response of the photodetector) may be processed using signal deconvolution techniques to generate range profile information for all the other spatial or SLM patterns (block 54). The range profiles for the different SLM patterns may then be processed using spatial processing algorithms to generate the two-dimensional depth map (block 56). In the discussion that follows, the above described processing steps will be described in greater detail for example implementations. First, however, a coordinate system for use in describing a measurement environment will be described.

FIG. 3 is a series of diagrams illustrating an exemplary measurement setup and coordinate system that may be used during a depth information acquisition procedure for a scene of interest in accordance with an embodiment. As shown in FIG. 3A, a selected SLM pattern 70 may be focused on a the scene 72 using a focusing system 74. The center of the focusing system 74 may be denoted by O and is also the origin for a 3D Cartesian coordinate system 76. All angles and distances may be measured with respect to this global coordinate system. In the present example, the pixels of the SLM pattern are considered to be binary (i.e., each SLM pixel is chosen to be either fully opaque or fully transparent). As will be described later, in other implementations, continuous valued or grayscale SLM patterns may be used (e.g., to compensate for rapidly varying scene texture and reflectance, etc.).

Figure 4A:
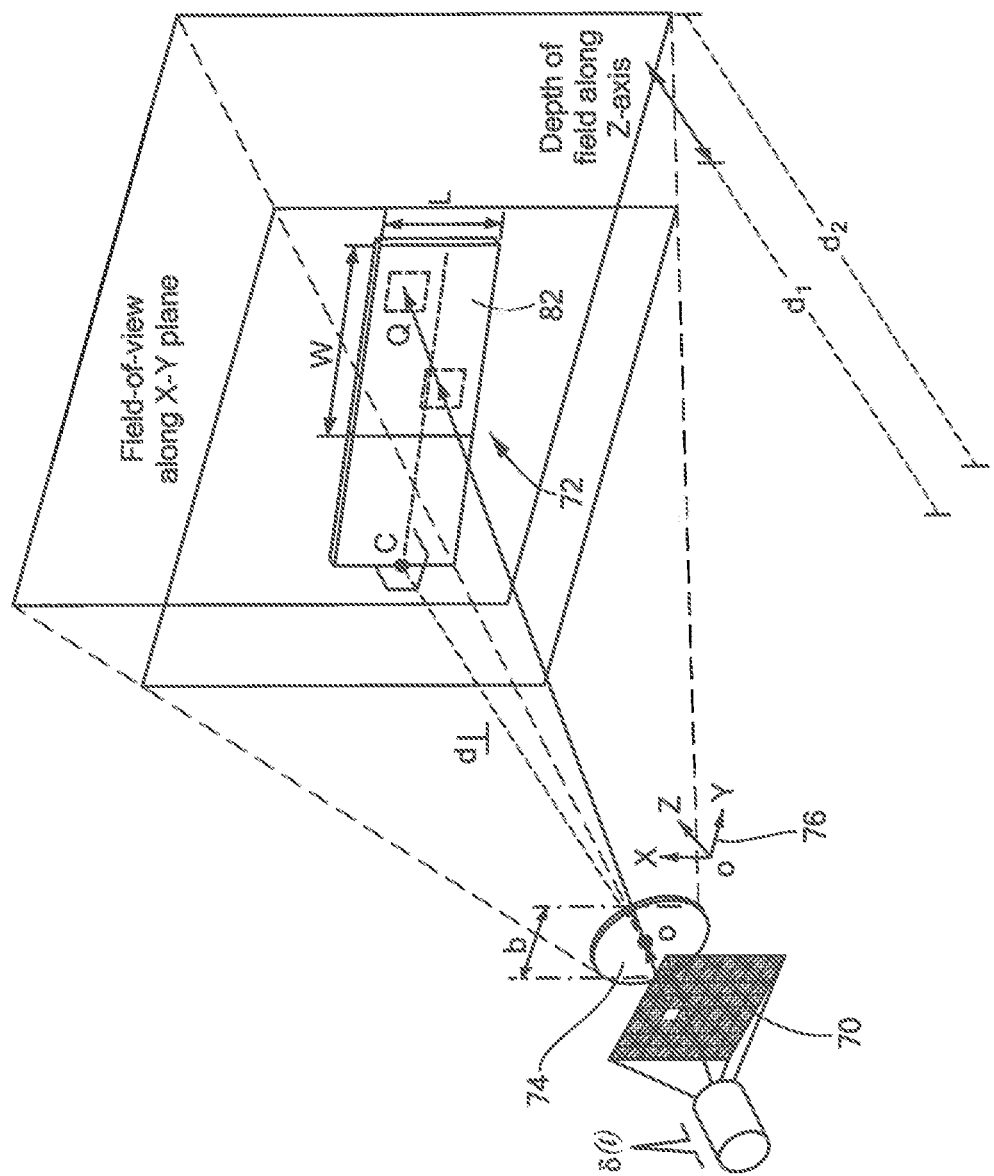
FIGS. 4A-4D are diagrams illustrating a coordinate system for use in describing an imaging environment in accordance with an embodiment.
Figure 4B:
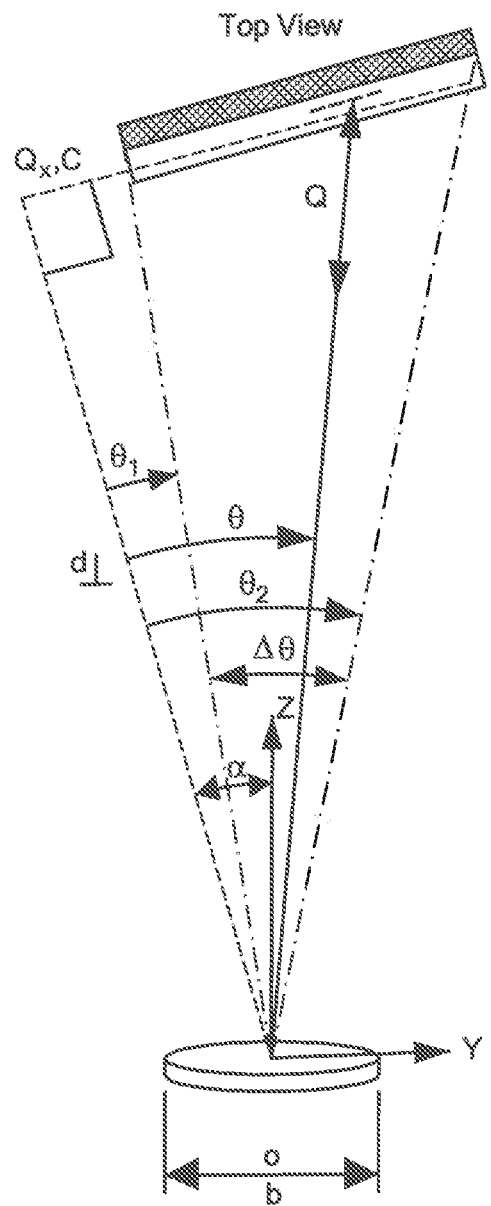
Figure 4C:
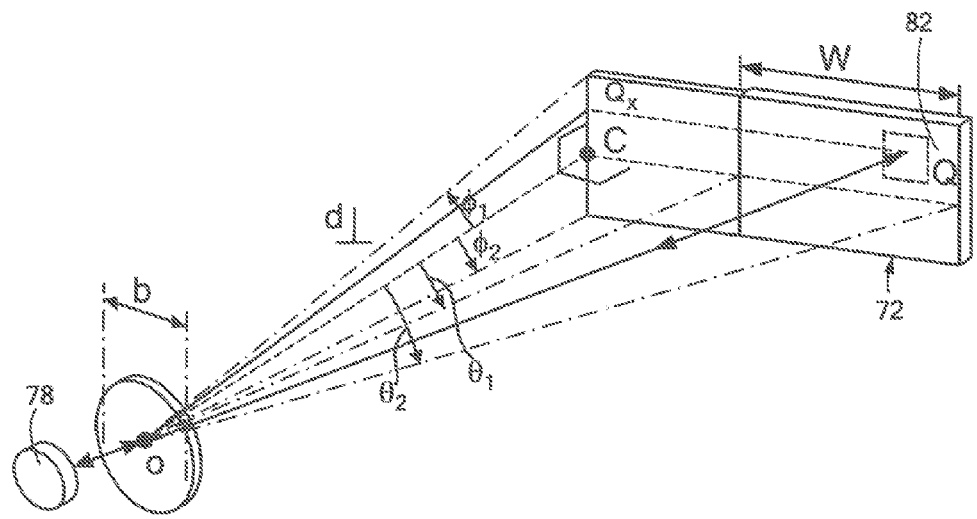
Figure 4D:
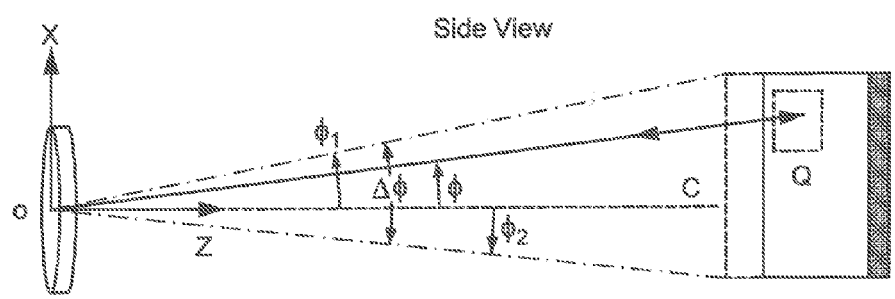

As shown in FIG. 4C, the light reflected from scene 72 is focused at photodetector 78. The origin O is the effective optical center of the entire imaging setup (illumination and detector).

In the discussion that follows, it will be assumed for simplicity of description that the scene of interest includes a single rectangular planar facet 82. This will later be extended to scenes have more complex content. As shown in FIG. 4A, the dimensions of the facet 82 are W×L. Line OC may be defined as the line that lies in the Y-Z plane and is also perpendicular to the rectangular facet. The plane is tilted from the zero-azimuth axis (marked Z in FIG. 4). However, as will be described later, this tilt does not affect the depth map construction. For simplicity, it will be assumed that there is no tilt from the zenith axis (marked X in FIG. 4). However, as with the tilt from the zero-azimuth axis, this tilt would not affect the depth map construction.

As shown in FIG. 4C, the following parameters may be used to completely specify rectangular facet 82:

$d_\perp$ denotes the length of the line OC.

$\phi_1$ and $\phi_2$ are angles between line OC and the extreme rays connecting the vertical edges of rectangular facet 82 to O, and $\Delta\phi = |\phi_1 - \phi_2|$ is their difference; clearly. $\Delta\phi$ is related to L.

$\theta_1$ and $\theta_2$ are angles between line OC and the extreme rays connecting the horizontal edges of rectangular facet 82 to O, and $\Delta\theta = |\theta_1 - \theta_2|$ is their difference; clearly, $\Delta\theta$ is related to W.

$\alpha$ is the angle between OC and the Z axis in the Y-Z plane.

The response of a single rectangular facet to a fully transparent SLM pattern will now be described. As shown in FIG. 4, Q is a point on the rectangular planar facet at an angle of $\theta$ ($\theta_1 < \theta < \theta_2$) and $\phi$ ($\phi_1 < \phi < \phi_2$) with respect to the line OC. An illumination pulse, s(t), that originates at the origin at time t=0 will be reflected from Q, attenuated due to scattering, and arrive back at the detector 78 delayed in time by an amount proportional to the distance 2|OQ|. Since the speed of light is set to unity, the delay is exactly equal to the distance 2|OQ|. Thus, the signal incident on photodetector 78 in response to impulse illumination of Q is mathematically given by:

$$q(t) = a\delta(t - 2|OQ|),$$

where a is the total attenuation (transmissivity) of the unit-intensity pulse. Since the photodetector has an impulse response, denoted by h(t), the electrical output $r_q(t)$ of the photodetector is mathematically equivalent to convolution of the signal q(t) and the detector response h(t):

$$r_q(t) = h(t) * a\delta(t - 2|OQ|) = ah(t - 2|OQ|).$$

Figure 5A:
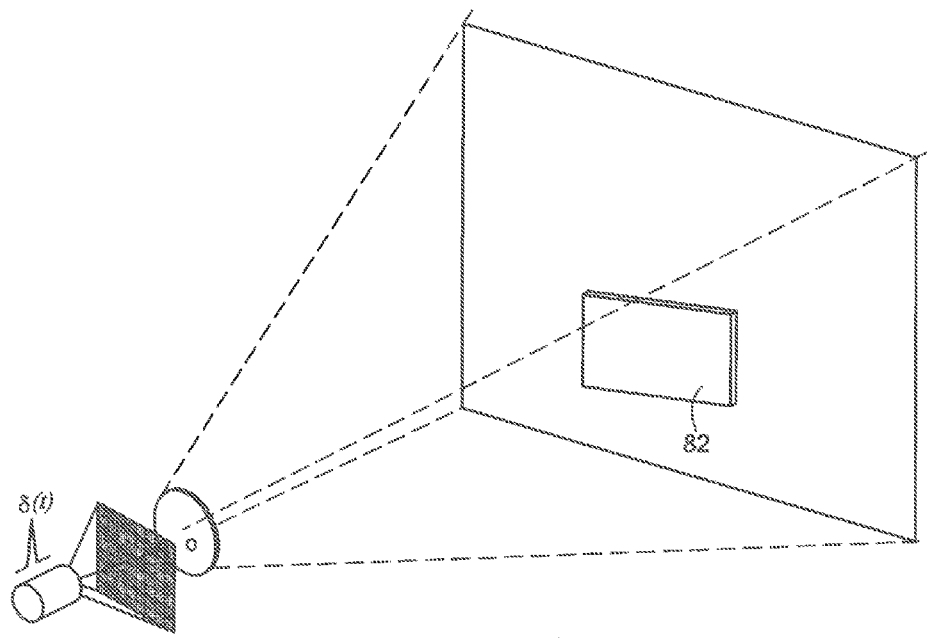
FIGS. 5A-5C are diagrams illustrating the response of a single rectangular facet of a scene of interest to a fully transparent SLM pattern in accordance with an embodiment.
Figure 5B:
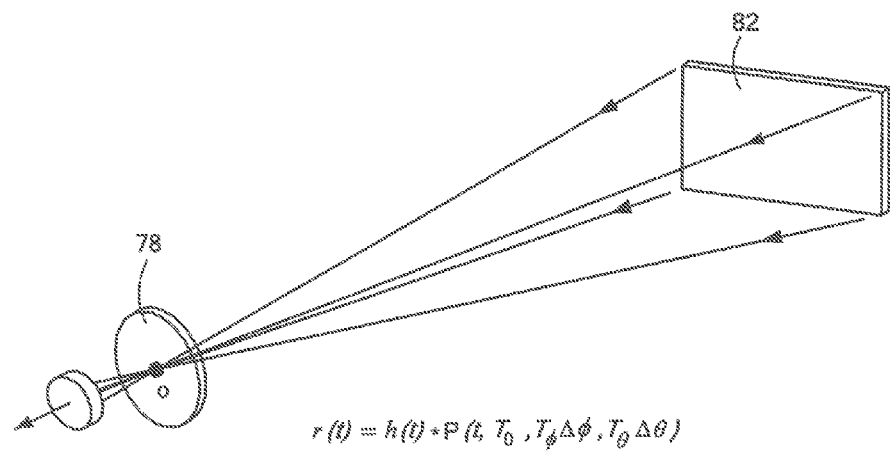

Next, the expression for $r_q(t)$ may be used to model the response of scene 72 in illumination to a fully transparent SLM pattern (see FIG. 5). The signal r(t) obtained in this case is the total light incident at photodetector 78 from all possible positions of Q on the rectangular facet:

$$r(t) = a\int_{\phi_1}^{\phi_2}\int_{\theta_1}^{\theta_2} h(t - 2|OQ(\phi, \theta)|)d\theta d\phi, \quad (1)$$

presuming a linear detector response. From FIG. 4, it should be noted that $|OQ(\phi, \theta)| = d_\perp\sqrt{\sec^2\phi + \tan^2\theta}$. Thus, substituting in the above equation results in:

$$r(t) = a\int_{\phi_1}^{\phi_2}\int_{\theta_1}^{\theta_2} h(t - 2d_\perp\sqrt{\sec^2\phi + \tan^2\theta})d\theta d\phi$$

$$= a\int_0^{\Delta\phi}\int_0^{\Delta\theta} h(t - 2d_\perp\sqrt{\sec^2(\phi_1 + \phi) + \tan^2(\theta_1 + \theta)})d\theta d\phi,$$

where the equality follows from a change of variables $\phi \leftarrow (\phi - \phi_1)$ and $\theta \leftarrow (\theta - \theta_1)$. Since $\theta \in [0, \Delta\theta]$ and $\phi \in [0, \Delta\phi]$ are small angles, $\sqrt{\sec^2(\phi_1 + \phi) + \tan^2(\theta_1 + \theta)}$ is approximated well using a first-order expansion:

$$\sqrt{\sec^2((\phi_1 + \phi) + \tan^2\theta_1 + \theta)} \approx \sqrt{\sec^2\phi_1 + \tan^2\theta_1} +$$

$$\frac{1}{\sqrt{\sec^2\phi_1 + \tan^2\theta_1}}((\tan\phi_1\sec^2\phi_1)\phi + (\tan\theta_1\sec^2\theta_1)\theta).$$

For notational simplicity, let $\gamma(\phi_1, \theta_1) = \sqrt{\sec^2\phi_1 + \tan^2\theta_1}$. The above equation for r(t) may thus be approximated by:

$$r(t) = a\int_o^{\Delta\phi}\int_o^{\Delta\theta} h\left(t - 2d_\perp\left(\gamma(\phi_1, \theta_1) + \frac{(\tan\phi_1\sec^2\phi_1)\phi + \tan\theta_1\sec^2\theta_1)\theta}{\gamma(\phi_1, \theta_1)}\right)\right)d\theta d\phi$$

$$= a\int_0^{\Delta\phi}\int_0^{\Delta\theta} h(t - \tau(\phi, \theta))d\theta d\phi,$$

where $$\tau(\phi, \theta) = \quad (2)$$

$$2d_\perp\gamma(\phi_1, \theta_1) + \frac{2d_\perp}{\gamma(\phi_1, \theta_1)}(\tan\phi_1\sec^2\phi_1)\phi + \frac{2d_\perp}{\gamma(\phi_1, \theta_1)}(\tan\theta_1\sec^2\theta_1)\theta.$$

It is now noted that the range profile of a scene comprising a single rectangular plane is a linear function of the depth values. More generally the range profile of a natural scene is a smoothly varying function of depth with only finite number of discontinuities. This is the central observation that allows the returned signal (the scene range profile) to be modeled using a parametric signal processing framework and recover the scene depth variations using the proposed acquisition setup. Again, for notational simplicity, let:

$$T_0 = 2d_\perp\gamma(\phi_1\theta_1), \; T_\phi = \frac{2d_\perp}{\gamma(\phi_1, \theta_1)}\tan\phi_1\sec^2\phi_1,$$

$$T_\theta = \frac{2d_\perp}{\gamma(\phi_1, \theta_1)}\tan\phi_1\sec^2\theta_1.$$

Note that $T_0 > 0$ for all values of $\phi_1$ and $\theta_1$, but $T_\phi$ and $T_\theta$ may be negative or positive. With this notation and a change of variables, $\tau_1 \leftarrow T_\phi\phi$ and $\tau_2 \leftarrow T_\theta\theta$ the following is obtained:

$$r(t) = a\int_0^{\Delta\phi}\int_0^{\Delta\theta} h(t - T_0 - T_\phi\phi - T_\theta\theta)d\theta d\phi,$$

$$= \frac{a}{T_0 T_\theta}\int_0^{T_\phi\Delta\phi}\int_0^{T_\theta\Delta\theta} h(t - T_0 - \tau_1 - \tau_2)d\tau_1 d\tau_2$$

Figure 5C:
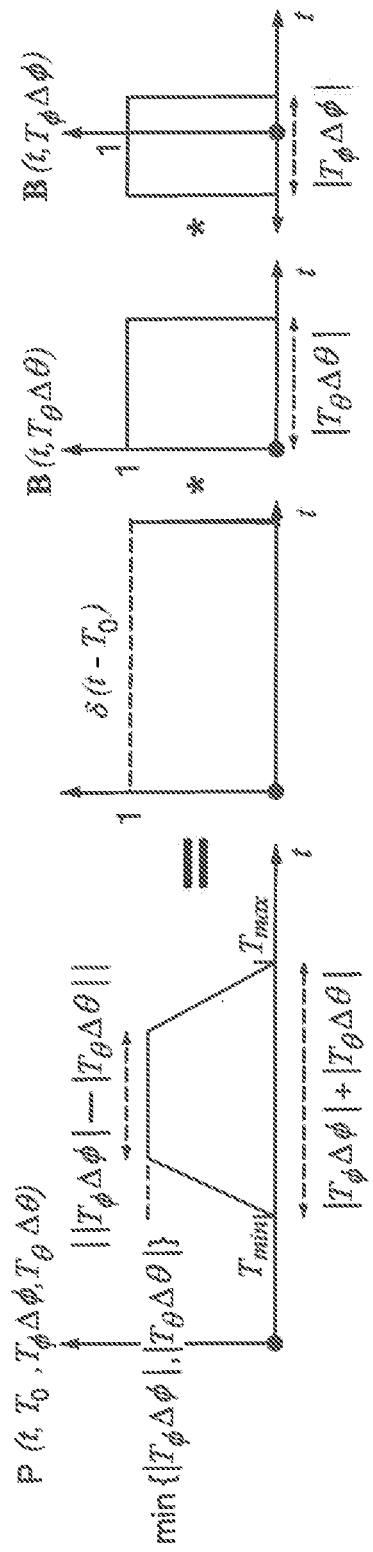

-continued $$= \frac{a}{T_\phi T_\theta} h(t) * \delta(t - T_0) * \int_0^{T_\phi \Delta \phi} \delta(t - \tau_1) * \int_0^{T_\theta \Delta \theta} \delta(t - \tau_2) d\tau_2$$

$$= \frac{a}{T_\phi T_\theta} h(t) * \delta(t - T_0) * B(t, T_\phi \Delta \phi) * B(t, T_\theta \Delta \theta)$$

where B(t, T) is the box function with width |T| as shown in FIG. 5C and defined as:

$$B(t, T) = \begin{cases} 1, & \text{for } t \text{ between 0 and } T; \\ 0, & \text{otherwise.} \end{cases}$$

The function B(t, T) is a parametric function that can be described with a small number of parameters despite its infinite Fourier bandwidth. The convolution of $B(t, T_\phi \Delta \phi)$ and $B(t, T_\theta \Delta \theta)$, delayed in time by $T_0$, is another parametric function as shown in FIG. 5C. This function will be denoted $P(t, T_0, T_\phi \Delta \phi, T_\theta \Delta \theta)$. It is piecewise linear and plays a central role in the present depth acquisition approach for piecewise-planar scenes. With this notation, the following is obtained:

$$r(t) = \frac{a}{T_\phi T_\theta} h(t) * P(t, T_0, T_\phi \Delta \phi, T_\theta \Delta \theta)$$

Figure 6:
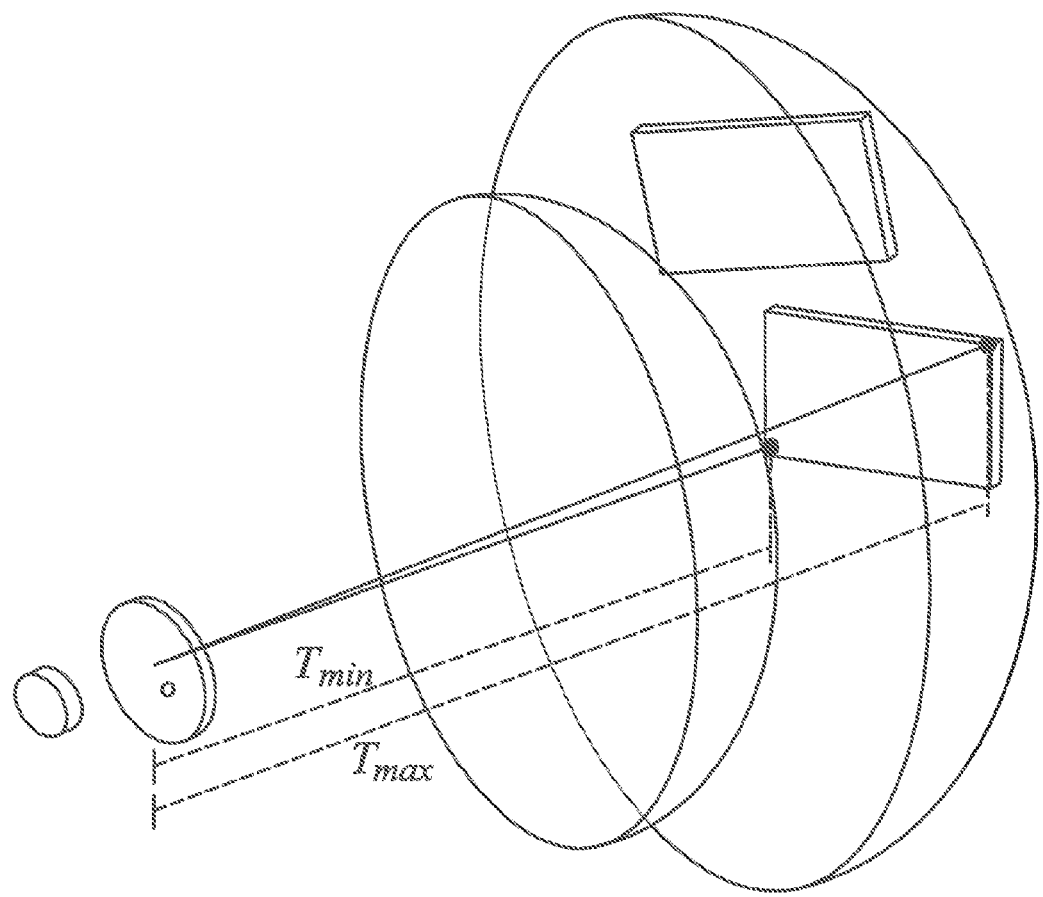
FIG. 6 is a diagram illustrating a spherical shell centered at an origin of a coordinate system with inner and outer radii equal to closest distance to the scene and the farthest distance to the scene from the imaging device, respectively.

The function $P(t, T_0, T_\phi \Delta \phi, T_\theta \Delta \theta)$ is nonzero over a time interval $t \in [T_{min}, T_{max}]$ that is precisely the time interval in which reflected light from the points on the rectangular planar facet arrives at the detector. Also, it is noted that $T_0$ is equal to the distance between O and the lower left corner of the rectangular plane, but it may or may not be the point on the plane closest to O. With knowledge of $T_{min}$ and $T_{max}$, a region of certainty may be obtained in which the rectangular facet lies. This region is a spherical shell centered at O with inner and outer radii equal to $T_{min}$ and $T_{max}$, respectively (see FIG. 6). Within this shell, the rectangular planar facet may have many possible orientations and positions.

In the ongoing example of a scene comprising a single planar facet, we desire to estimate the function $P(t, T_0, T_\phi \Delta \phi, T_\theta \Delta \theta)$ and hence the values of $T_{min}$ and $T_{max}$ by processing the digital samples r[k] of the function r(t). The detector impulse response h(t) may be modeled as a band limited lowpass filter. Thus, the general deconvolution problem of obtaining $P(t, T_0, T_\phi \Delta \phi, T_\theta \Delta \theta)$ from samples r[k] is ill-posed and highly sensitive to noise. However, modeling shows that the light transport function $P(t, T_0, T_\phi \Delta \phi, T_\theta \Delta \theta)$ or the scene range profile is a parametric signal for natural scenes. This knowledge makes the recovery of $P((t, T_0, T_\phi \Delta \phi, T_\theta \Delta \theta)$ a well posed deconvolution problem that may be solved using a variety of signal deconvolution methods including, for example, the parametric signal processing framework described in "Sampling Moments and Reconstructing Signals of Finite Rate of Innovation: Shannon Meets Strang-Fix," by Dragotti et al., *IEEE Trans, Signal Process.* 55, 1741-1757 (2007) which is hereby incorporated by reference in its entirety.

It is it to emphasize that the analysis up to this point is independent of the tilt and orientation of the rectangular plane with respect to the global coordinate system (i.e., the tilt has not appeared in any mathematical expression). Thus, the scene range profile is the function $P(t, T_0, T_\phi \Delta \phi, T_\theta \Delta \theta)$ which describes that the light transport between the imaging device and the rectangular planar facet is independent of the orientation of the line OC. This is intuitive because all the results were derived by considering a new frame of reference involving the rectangular plane and the normal to the plane from the origin, OC. The derived parametric light signal expressions themselves do not depend on how OC is oriented with respect to the global coordinate system, but rather depend on the relative position of the plane with respect to OC. This explains why it is not possible to infer the position and orientation of the planar facet in the field of view of the system from the estimates of $P(t, T_0, T_\phi \Delta \phi, T_\theta \Delta \theta)$. Recovery of the position and orientation of a rectangular planar facet is accomplished using patterned illuminations and associated processing.

In general, the SLM pixels discretize the FOV into small squares of size $\Delta \times \Delta$. The SLM pixels and the corresponding scene points may be indexed by (i, j). Since the scene is illuminated with a series of M different binary SLM patterns, an index p may be used for the illumination patterns. The full collection of binary SLM values may be denoted $\{c_{i,j}^p: i=1, \ldots, N, j=1, \ldots, N, p=1, \ldots, M\}$.

In the discussion that follows, D will be used to denote the depth map to be constructed. In addition, $D_{ij}$ will be used to denote the depth in the direction of illumination of SLM pixel (i, j), assuming rays in that direction intersect the rectangular facet. $D_{ij}$ will be set to zero otherwise. As shown in FIG. 7A, the lower-left corner of the projection of the pixel onto the planar facet may be used. It is convenient to also define an index map, $I=\{I_{ij}: i=1, \ldots, N, j=1, \ldots, N\}$, associated with the rectangular facet where $I_{ij}=1$ if rays along SLM illumination pixel (i, j) intersect the rectangular facet and $I_{ij}=0$ otherwise.

If we consider the rectangular facet as being composed of smaller rectangular facets of size $\Delta \times \Delta$, then following the derivation described above, it is found that the light signal received at the detector in response to patterned, impulsive illumination of the rectangular facet is given by:

$$r^p(t) = \sum_{i=1}^{N} \sum_{j=1}^{N} c_{ij}^p I_{ij} \left( ah(t) * \int_0^\Delta \int_0^\Delta \delta(t - 2D_{ij} - 2x_l - 2y_l) dx_l dy_l \right) \quad (3)$$

$$= \sum_{i=1}^{N} \sum_{j=1}^{N} c_{ij}^p I_{ij} \left( \frac{a}{4} h(t) * \delta(t - 2D_{ij}) * B(t, \Delta) * B(t, \Delta) \right)$$

$$= \frac{a}{4} h(t) * \left( \sum_{i=1}^{N} \sum_{j=1}^{N} c_{ij}^p I_{ij} (\delta(t - 2D_{ij}) * B(t, \Delta) * B(t, \Delta)) \right).$$

Next, the signal $U^p(t)$ is defined as:

$$U^p(t) = \sum_{i=1}^{N} \sum_{j=1}^{N} c_{ij}^p I_{ij} (\delta(t - 2D_{ij}) * B(t, \Delta) * B(t, \Delta)).$$

The function $\Delta(t, \Delta) = B(t, \Delta) * B(t, \Delta)$ has a triangular shape with a base width of $2\Delta$ as shown in FIG. 7C. In practice, when the SLM has high spatial resolution then $\Delta$ is very small (i.e., $\Delta \ll W$, $\Delta \ll L$, and $\Delta(t, \Delta)$ approximates a Dirac delta function $\delta(t)$). Thus, for a high resolution SLM, the signal $U^p(t)$ is a weighted sum of uniformly-spaced impulses where the spacing between impulses is equal to $2\Delta$. Mathematically, we use $\lim_{\Delta \to 0} B(t, \Delta) * B(t, \Delta) = \lim_{\Delta \to 0} \delta(t-\Delta) = \delta(t)$ in the above equation to obtain:

$$\lim_{\Delta \to 0} U^p(t) = \sum_{i=1}^{N}\sum_{j=1}^{N} c_{ij}^P I_{ij}(\delta(t-2D_{ij}) * \delta(t)) = \sum_{i=1}^{N}\sum_{j=1}^{N} c_{ij}^P I_{ij}\delta(t-2D_{ij}).$$

The parametric signal $U^p(t)$ is obtained in the process of illuminating the scene with a patterned illumination and collecting light from illuminated portions of the scene ($c_{ij}^P=1$) where the rectangular planar facet is present ($I_{ij}=1$). In particular, for a small value of $\Delta$ and fully transparent SLM pattern (all-ones or ($c_{ij}^P=1$) i=1, ..., N, j=1, ..., N) we have the following relation:

$$r^{all-ones}(t) = \lim_{\Delta \to 0}\sum_{i=1}^{N}\sum_{j=1}^{N} I_{ij}\left(ah(t) * \int_0^\Delta \int_0^\Delta \delta(t-2D_{ij}-2x_l-2y_l)dx_l dx_l\right)$$

$$= \int_{\phi_1}^{\phi_2}\int_{\theta_1}^{\theta_2} h(t-2|OQ(\phi,\theta)|)d\theta d\phi$$

$$= r(t)$$

which follows from the fact that the double-summation approximates the double integral in the limiting case ($\Delta \to 0$). Additionally, this equation implies that $U^{all-ones}(t) = P(t, T_0, T_\phi\Delta_\phi, T_\theta\Delta_\theta)$. An important observation that stems from this fact is that for any chosen illumination pattern, the signal $U^p(t)$ and the signal $P(t, T_0, T_\phi\Delta_\phi, T_\theta\Delta_\theta)$, which is obtained by using the all-ones or fully-transparent illumination pattern, have support in time $[T_{min}, T_{max}]$. To be precise, if the points on the rectangular planar facet that are closest and farthest to O are illuminated, then both $U^p(t)$ and $P(t, T_0, T_\phi\Delta_\phi, T_\theta\Delta_\theta)$ have exactly the same duration and time delay. In practice, the binary patterns are randomly chosen with at least half of the SLM pixels "on," so it is highly likely that at least one point near the point closest to O and at least one point near the point farthest from O are illuminated. Hence, $U^p(t)$ and $P(t, T_0, T_\phi\Delta_\phi, T_\theta\Delta_\theta)$ are likely to have approximately the same time support and time delay offset. Because the speed of light is normalized to unity, this implies $D_{ij} \in [T_{min}, T_{max}]$.

Digital samples of the received signal $r^p[k]$ allow the depth map D to be recovered. First, it is noted that the set of distance values, $\{D_{ij}: i=1, \ldots, N, j=1, \ldots, N\}$, may contain repetitions (i.e., several (i,j) positions may have the same depth value $D_{ij}$). All of these points will lie on a circular arc on the rectangular facet as shown in FIG. 7A. Each $D_{ij}$ belongs to the set of equally-spaced distinct depth values $\{d_1, d_2, \ldots, d_L\}$ where:

$$L = \frac{T_{max} - T_{min}}{2\Delta}, d_1 = T_{min}, d_l = d_1 + 2\Delta l, l = 1 \ldots L.$$

Figure 8:
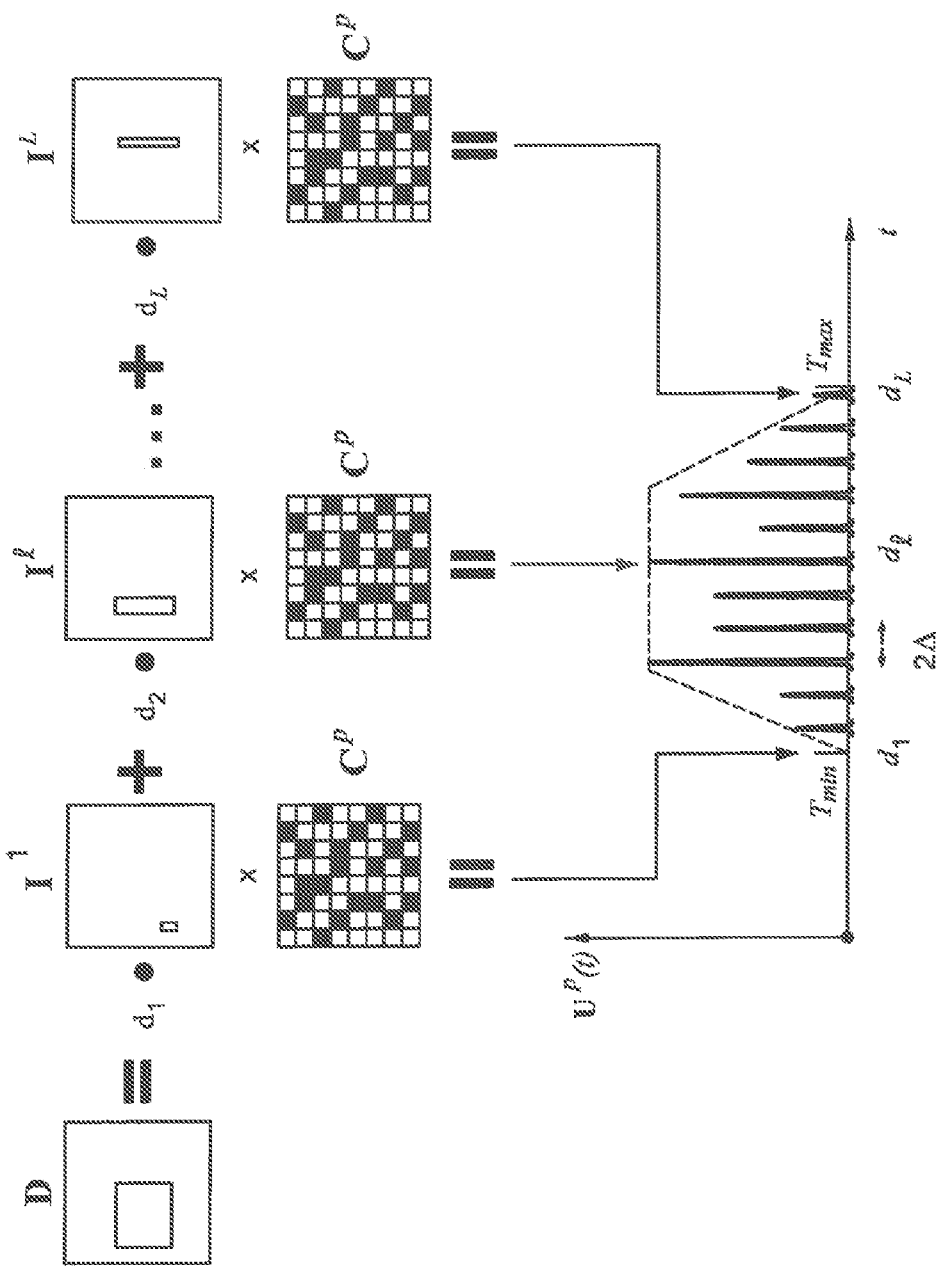
FIG. 8 is a diagram illustrating the generation of depth masks in accordance with an embodiment.

Note that the linear variation of the depths $d_1, d_2, \ldots, d_L$ is a direct consequence of Eg. (2), which states that there is a linear variation of distance from O of the closest point on the rectangular facet to the farthest. In the case of a fully transparent SLM illumination pattern discussed previously, the continuous signal $P(t, T_0, T_\phi\Delta_\phi, T_\theta\Delta_\theta)$ may be obtained. In the case of patterned illumination, a signal $U^p(t)$ is obtained that is a weighted sum of uniformly spaced impulses. With this new observation, we have:

$$\lim_{\Delta \to 0} U^{p(t)} = \sum_{i=1}^{N}\sum_{j=1}^{N} c_{ij}^P I_{ij}\delta(t-2D_{ij}) - \sum_{l=1}^{L}\left(\sum_{i=1}^{N}\sum_{j=1}^{N} c_i^P I_{ij}^l\right)\delta(t-2d_l), \quad (4)$$

where we define the matrix $I^l$ as:

$$I_{ij}^l = \begin{cases} 1, & \text{if } D_{ij}=d_l; \\ 0, & \text{otherwise,} \end{cases}$$

so $I_{ij} = \sum_{l=1}^{L} I_{ij}^l$, and $D_{ij} = \sum_{l=1}^{L} d_l I_{ij}^l$. With this new notation, the depth map associated with the rectangular facet is the weighted sum of the index maps $\{I^l: l=1, \ldots, L\}$ (see FIG. 8). Thus, constructing the depth map is now solved by finding the L binary-valued index maps.

Taking the Fourier transform $F\{\bullet\}$ of the signals on both sides of Eq. (4) gives the following:

$$\mathcal{F}\left\{\lim_{\Delta \to 0} U^p(t)\right\} = \mathcal{F}\left\{\sum_{l=1}^{L}\left(\sum_{i=1}^{N}\sum_{j=1}^{N} c_{ij}^P I_{ij}^l\right)\delta(t-2d_l)\right\}$$

$$\sum_{l=1}^{L}\left(\sum_{i=1}^{N}\sum_{j=1}^{N} c_{ij}^P I_{ij}^l\right)\mathcal{F}\{\delta(2-2d_l)\} = \sum_{l=1}^{L}\left(\sum_{i=1}^{N}\sum_{j=1}^{N} c_{ij}^P I_{ij}^l\right)e^{-i\omega 2d_l}$$

where $i=\sqrt{-1}$. From elementary Fourier analysis and Eq. (3) it is known that:

$$\mathcal{F}\{r^p(t)\} = \frac{a}{4}\mathcal{F}\{h(t) * U^p(t)\} = \frac{a}{4}\mathcal{F}\{h(t)\}\mathcal{F}\{U^p(t)\}.$$

The ADC is used to sample the signal incident on the photodetector at a sampling frequency of f samples per second. Then, using elementary sampling theory, the following relation is obtained:

$$\mathcal{F}\{r^p[k]\} = \frac{af}{4}\mathcal{F}\{h[k]\}\mathcal{F}\{U^p[k]\}\frac{\mathcal{F}\{r^p[k]\}}{\mathcal{F}\{h[k]\}}$$

$$= \frac{af}{4}\sum_{l=1}^{L}\left(\sum_{i=1}^{N}\sum_{j=1}^{N} c_{ij}^P I_{ij}^l\right)e^{-i(4\pi f d_l)k}.$$

K is used to denote the total number of samples collected by the ADC. Likewise, the discrete Fourier transform (DFT) of the samples $\{r^p[k]: k=1, \ldots, K\}$ is denoted by $\{R^p[k]: k=1, \ldots, K\}$. Similarly, $\{H^p[k]: k=1, \ldots, K\}$ is defined for the impulse response samples $\{h^p[k]: k=1, \ldots, K\}$. Then:

$$\frac{R^p[k]}{H[k]} = \frac{af}{4}\sum_{l=1}^{L}\left(\sum_{i=1}^{N}\sum_{j=1}^{N} c_{ij}^P I_{ij}^l\right)e^{-i(4\pi f d_l)k}, k = 1, \ldots, K \quad (5)$$

For notational simplicity let:

$$y_l^p = \sum_{i=1}^{N}\sum_{j=1}^{N} c_{ij}^P I_{ij}^l, l=1, \ldots, L. \quad (6)$$

The constants a and f may be computed using calibration and may be computationally compensated using normalization.

Since the values $(d_1, d_2, \ldots, d_L)$ are known, Eq. (5) can be represented as a system of linear equations as follows:

$$\begin{bmatrix} R^p[1]/H[1] \\ \vdots \\ R^p[k]/H[k] \\ \vdots \\ R^p[K]/H[K] \end{bmatrix} = \begin{bmatrix} 1 & \cdots & 1 & \cdots & 1 \\ \vdots & & \vdots & & \vdots \\ e^{-i(4\pi f d_1)k} & \cdots & e^{-i(4\pi f d_l)k} & \cdots & e^{-i(4\pi f d_L)k} \\ \vdots & & \vdots & & \vdots \\ e^{-i(4\pi f d_1)K} & \cdots & e^{-i(4\pi f d_l)K} & \cdots & e^{-i(4\pi f d_L)K} \end{bmatrix} \begin{bmatrix} y_1^p \\ \vdots \\ y_l^p \\ \vdots \\ y_L^p \end{bmatrix}$$

which can be compactly written as:

$$R^p/H = V y^p \quad (7)$$

(where the division is element wise). The matrix V is a Vandermonde matrix. Therefore, $K \geq L$ ensures that we can uniquely solve the linear system in Eq. (7). Furthermore, a larger value of K allows us to mitigate the effect of noise by producing least square estimates of $y^p$.

Next, from Eq. (6) we see that $y^p$ can also be represented with a linear system of equations as follows:

$$\begin{bmatrix} y_1^p \\ \vdots \\ y_l^p \\ \vdots \\ y_L^p \end{bmatrix} = \begin{bmatrix} I_{11}^1 & \cdots & I_{1N}^1 & I_{21}^1 & \cdots & I_{2N}^1 & \cdots & I_{N1}^1 & \cdots & I_{NN}^1 \\ \vdots & & \vdots & \vdots & & \vdots & & \vdots & & \vdots \\ I_{11}^l & \cdots & I_{1N}^l & I_{21}^l & \cdots & I_{2N}^l & \cdots & I_{N1}^l & \cdots & I_{NN}^l \\ \vdots & & \vdots & \vdots & & \vdots & & \vdots & & \vdots \\ I_{11}^L & \cdots & I_{1N}^L & I_{21}^L & \cdots & I_{2N}^L & \cdots & I_{N1}^L & \cdots & I_{NN}^L \end{bmatrix} \begin{bmatrix} c_{11}^p \\ \vdots \\ c_{1N}^p \\ c_{21}^p \\ \vdots \\ c_{2N}^p \\ \vdots \\ c_{N1}^p \\ \vdots \\ c_{NN}^p \end{bmatrix} \quad (8)$$

From the M different binary SLM illumination patterns, we get M instances of Eq. (8) that can be combined into the compact representation as follows:

$$\underbrace{y}_{L \times M} = \underbrace{[I^1 \ \cdots \ I^l \ \cdots \ I^L]^T}_{L \times N^2} \underbrace{C}_{N^2 \times M}.$$

This system of equations is under-constrained since there are $L \times N^2$ unknowns (corresponding to the unknown values of $[I^1 \ldots I^l \ldots I^L]$) and only $L \times M$ available transformed data observations y. Note that y is computed using a total of $K \times M$ samples of the light signals received in response to $M \ll N^2$ patterned illuminations.

The goal now is to recover the depth map D, which has $N \times N$ entries. To enable depth map reconstruction even though there are much fewer observations than unknowns, the structure of scene depth may be exploited. It is known that the depth values $D_{ij}$ to the distances from O to points that are constrained to lie on a rectangular facet and that the distances $D_{ij}$ are also linearly spaced between $d_1$ and $d_L$. The planar constraint and linear variation imply that the depth map D is sparse in the second-finite difference domain. By exploiting this sparsity of the depth map, it is possible to recover D from the data y by solving the following constrained $l_1$ regularized optimization problem:

$$OPT: \min_D \| y - [I^1 \ \cdots \ I^l \ \cdots \ I^L]^T C \|_F^2 + \|(\Phi \otimes \Phi^T)D\|_1$$

subject to $\sum_{l=1}^{L} I_{ij}^l = 1$, for all $(i, j)$, $\sum_{l=1}^{L} d_l I^l = D$, and $I_{ij}^l \in \{0, 1\}, l = 1, \ldots, L, i = 1, \ldots, N, j = 1, \ldots, N$.

Here the Frobenius matrix norm squared $\|.\|_F^2$ is the sum-of-squares of the matrix entries, the matrix $\phi$ is the second-order finite difference operator matrix:

$$\Phi = \begin{bmatrix} 1 & -2 & 1 & 0 & \cdots & 0 \\ 0 & 1 & -2 & 1 & \cdots & 0 \\ \vdots & \vdots & \ddots & \ddots & \ddots & \vdots \\ 0 & \cdots & 0 & 1 & -2 & 1 \end{bmatrix}$$

and $\otimes$ is the standard Kronecker product for matrices.

The optimization problem OPT has an intuitive interpretation. Our objective is to find the depth map D that is most consistent with having a piecewise-planar scene. Such scenes are characterized by D having a discrete two-dimensional Laplacian $(\Phi \otimes \Phi^T) D$ with a small number of nonzero entries (corresponding to the boundaries of the planar facets). The number of nonzero entries (the "$l_0$ pseudonorm") is difficult to use because it is nonconvex and not robust to small perturbations, and the $l_1$ norm is a suitable proxy with many optimality properties. The problem OPT combines the above objective with maintaining fidelity with the measured data by keeping $\|y - [I^1 \ldots I^l \ldots I^L]C\|_F^2$ small. The constraints $I_{ij}^l \in \{0, 1\}$ and $\Sigma_{l=1}^{L} I_{ij}^l = 1$ for all $(i,j)$ are a mathematical rephrasing of the fact that each point in the depth map has a single depth value so different depth values cannot be assigned to one position $(i, j)$. The constraint $\Sigma_{l=1}^{L} d_l I^l = D$ expresses how the depth map is constructed from the index maps.

While the optimization problem OPT already contains a convex relaxation in its use of $\|\Phi D\|_1$, it is nevertheless computationally intractable because of the integrality constraints $I_{ij}^l \in [0, 1]$. Using a further relaxation of $I_{ij}^l \in [0, 1]$ yields the following tractable formulation:

$$R\text{-}OPT: \min_D \| y - [I^1 \ \cdots \ I^l \ \cdots \ I^L]^T C \|_F^2 + \|(\Phi \otimes \Phi^T)D\|_1$$

subject to $\sum_{l=1}^{L} I_{ij}^l = 1$, for all $(i, j)$, $\sum_{l=1}^{L} d_l I^l = D$, and $I_{ij}^l \in [0, 1] \ l = 1, \ldots, L, i = 1, \ldots, N, j = 1, \ldots, N$.

In at least one example implementation, the convex optimization problem R-OPT was solved using CVX, a package for specifying and solving convex programs.

Figure 9:
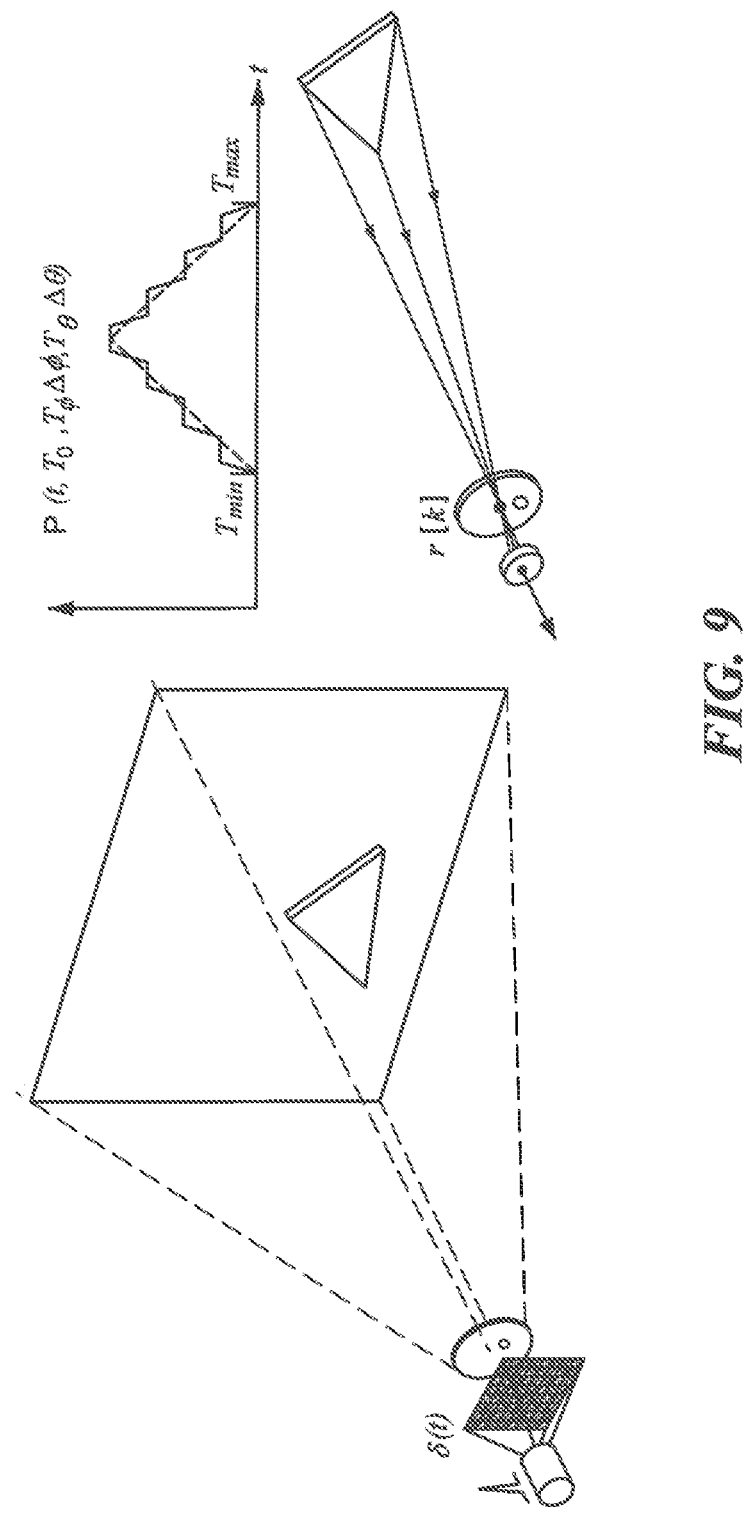
FIG. 9 is a diagram illustrating parametric modeling for non-rectangular planes in accordance with an embodiment.

In the discussion that follows, the received signal model and depth map reconstruction developed above is generalized to planar facets of any shape and scenes with multiple planar facets. The signal modeling techniques described above also appy to a planar facet with non-rectangular shape. For example, consider the illumination of a single triangular facet with a fully transparent SLM pattern, as shown in FIG. 9 (left panel). In this case, the light signal received at the detector is:

$$r(t) = a \int_{\phi_1}^{\phi_2} \int_{\theta_1(\phi)}^{\theta_2(\phi)} h(t - 2|OQ(\phi, \theta)|) d\theta d\phi.$$

Contrasting with Eq. (1), since the shape is not a rectangle, the angle θ does not vary over the entire range [θ$_1$, θ$_2$]. Instead, for a fixed value of angle φ, the angle θ can only vary from between some θ$_1$(φ) and some θ$_2$(φ). These limits of variation are determined by the shape of the object, as shown in FIG. 9 (right panel).

Since the planar facet is in the far field, the distances of plane points from O still vary linearly. As a result, r(t) is still equal to the convolution of the detector impulse response with a parametric signal whose shape depends on the shape of the planar facet. For example, as shown in FIG. 9 (right panel), the profile of the signal P(t, T$_0$, T$_φ$Δφ, T$_θ$Δθ) is triangular with jagged edges. The task of estimating the signal P(t, T$_0$, T$_φ$Δφ, T$_θ$Δθ) corresponding to a general shape, such as a triangle, from the samples r[k] is more difficult than estimating P(t, T$_0$, T$_φ$Δφ, T$_θ$Δθ) in the case of a rectangular facet. However, as can be seen from FIG. 9 (right panel), a good piecewise-linear fit may still be obtained using the samples of r[k]. This piecewise-linear approximation, although not exact, suffices for the purpose of estimating the shortest and farthest distance to the points on the planar facet. Thus, it is possible to estimate the values T$_{min}$ and T$_{max}$ using the samples r[k] without any dependence on the shape of the planar facet. Once T$_{min}$ and T$_{max}$ are estimated, we use the framework described previously to recover the depth map of the scene, which will also reveal the exact shape and orientation of the planar facet.

Figure 10A:
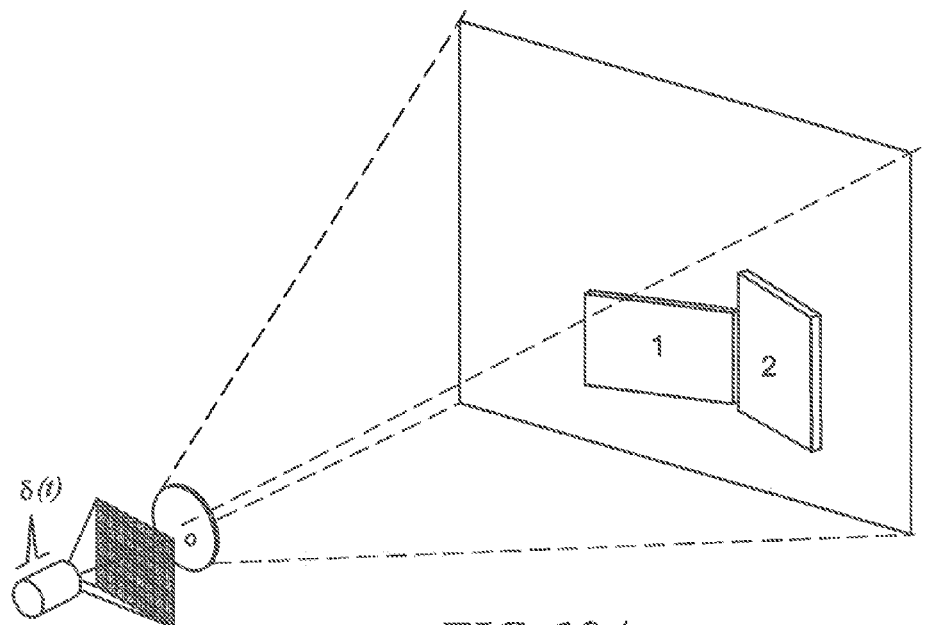
FIG. 10A-10F are diagrams illustrating parametric modeling for scenes with multiple planar facets in accordance with an embodiment.

When the scene has multiple planar facets, as shown in FIG. 10A, the linearity of light transport and the linear response of the detector together imply that the detector output is the sum of the signals received from each of the individual planar facets. This holds equally well for the cases of fully-transparent and patterned SLM illumination. FIG. 10A illustrates a scene composed of two planar facets 100, 102 illuminated with a fully transparent SLM pattern. The total response is given by:

$$r(t) = r_1(t) + r_2(t) = P_1(t, T_{0,1}, T_{φ,1}Δφ_1, T_{θ,1}Δθ_1) + P_2(t, T_{0,2}, T_{φ,2}Δφ_2, T_{θ,2}Δθ_2),$$

where r$_i$(t) and P$_i$ denote the response from planar facet i. The total response is thus a parametric signal. When points on two different planar facets are at the same distance from O (see, e.g., FIG. 10C), there is time overlap between P$_A$(t, T$_{0_A}$, T$_{φ_A}$Δφ$_A$, T$_{θ_A}$Δθ$_A$) and P$_B$(t, T$_{0_B}$, T$_{φ_B}$Δφ$_B$, T$_{θ_B}$Δθ$_B$) (see, e.g. FIG. 10E). In any case, closest distance T$_{min}$ and farthest distance T$_{max}$ can be estimated from r(t). Thus, the framework developed previously for estimating the distance set {d$_1$, d$_2$, ..., d$_L$} applies here as well. Note that no prior information is needed on how many planar facets are present in the scene.

Figure 10B:
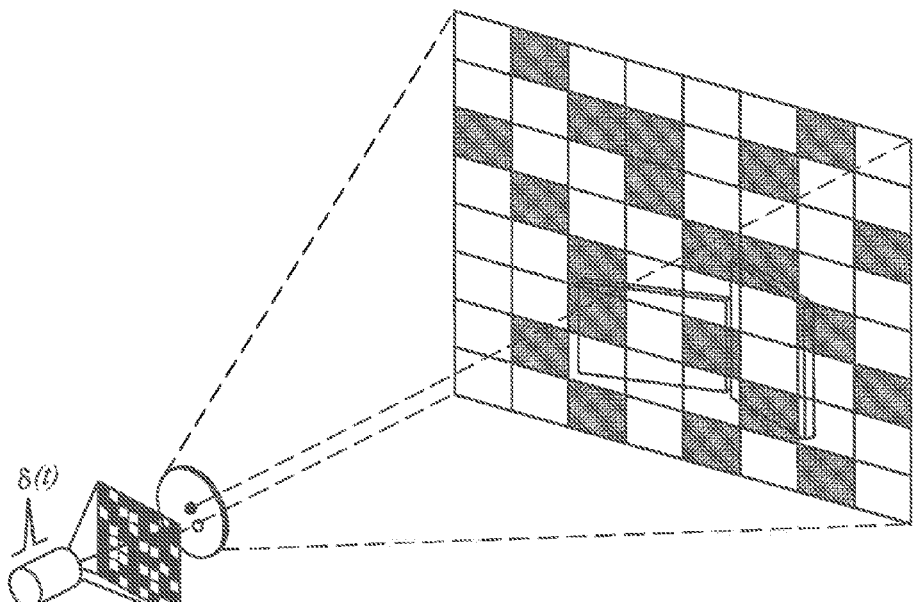
Figure 10C:
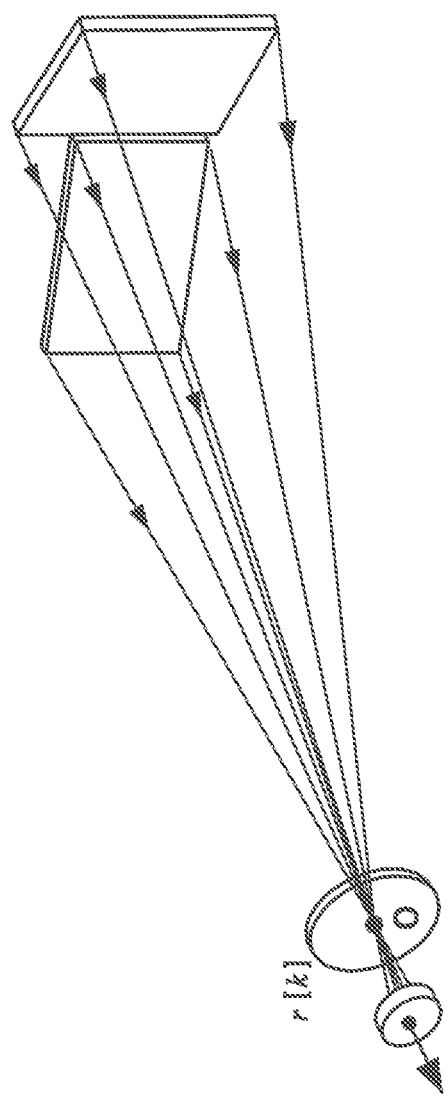
Figure 10D:
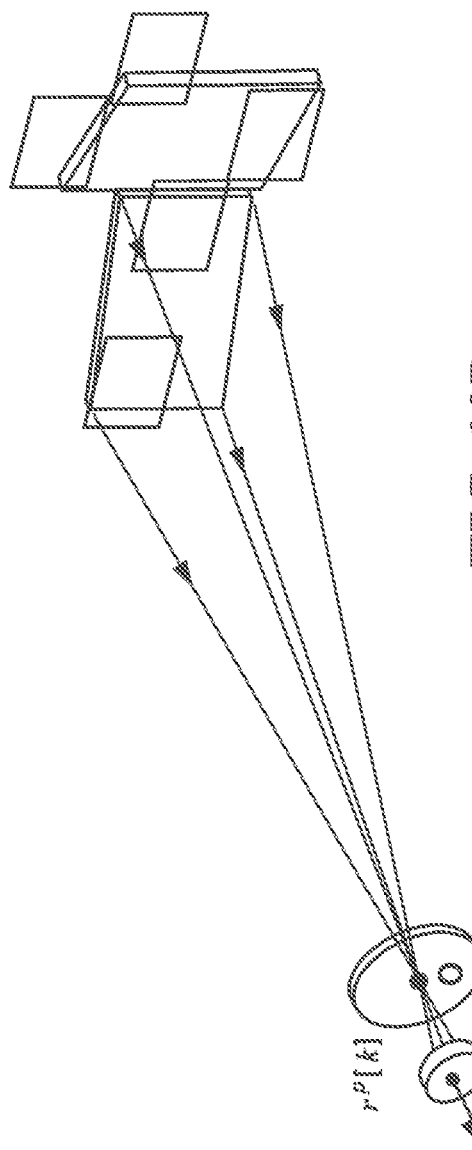
Figure 10E:
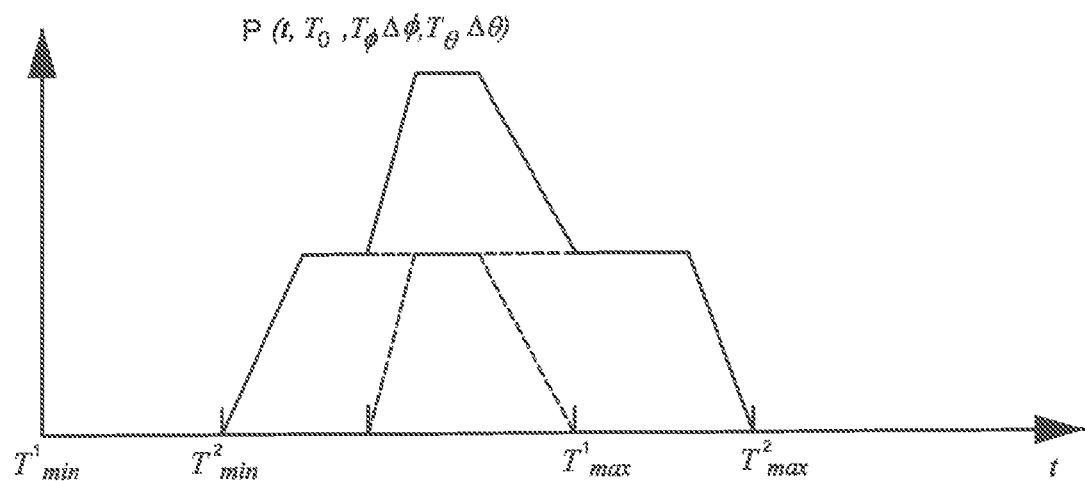
Figure 10F:
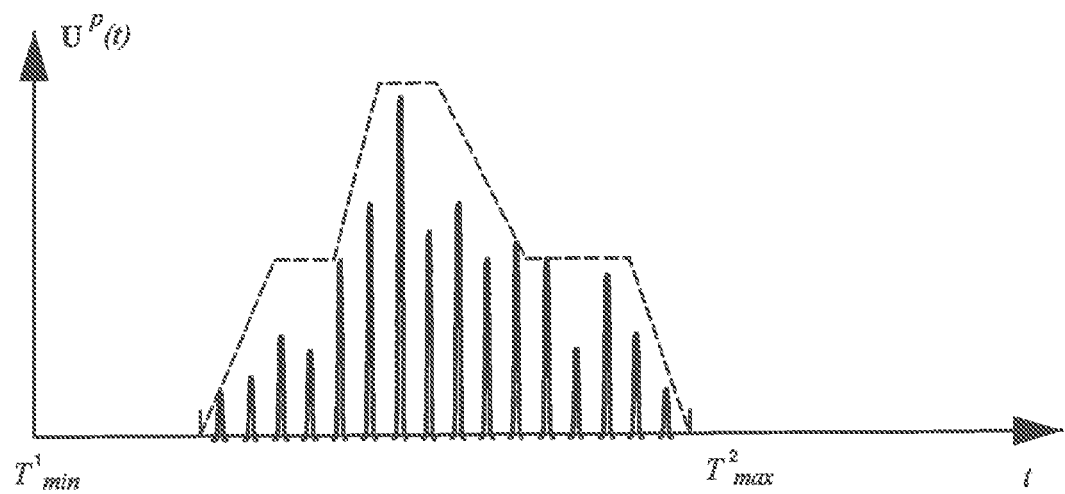

FIG. 10B illustrates the same scene illuminated with a patterned SLM setting. The response to pattern p may be expressed as:

$$r^p(t) = r_1^p(t) + r_2^p(t),$$

where r$_i^p$(t) is the response from planar facet i, we can similarly write:

$$U^p(t) = U_1^p(t) + U_2^p(t).$$

Thus, the problem of depth map reconstruction in case of scenes constituted of multiple planar facets may also be solved using convex optimization techniques. FIG. 10 illustrates rectangular facets that do not occlude each other, but the lack of occlusion is not a fundamental limitation. If a portion of a facet is occluded, it effectively becomes nonrectangular.

In summary, in some embodiments, the procedure for reconstructing the depth map of a natural scene is as follows:
1. Measure the digital samples of the impulse response of the photodetector {h[k]: k=1, ..., K}. It is assumed that the ADC samples are at least twice as fast as the bandwidth of the photodetector (Nyquist criterion).
2. Illuminate the entire scene with the first light pulse which may either be unmodulated or omnidirectional, or spatially modulated using an SLM pattern; and measure the digital samples of the received signal {r[k]: k=1, ..., K}. In case the source is periodic, such as an impulse train, the received signal r(t) will also be periodic and hence the samples need to be collected only in one period.
3. Process the received signal samples {r[k]: k=1, ..., K} and the impulse response samples, {h[k]: k=1, ..., K} using signal deconvolution to estimate the scene range profile.
4. Spatially pattern the scene with M=N$^2$/100 to N$^2$/10 times (1% to 10%) using pre-chosen SLM patterns, again using an impulsive light source. This spatial patterning of the scene may be done either by using a SLM to modulate the transmitted light pulses before they reach the scene, or by using an SLM to spatially modulate the light that is reflected back from the scene; both methods of spatially patterning the scene may be used simultaneously as well.
5. Record K digital time samples of the light signal received at the photodetector in response to each of the scene patterns.
6. For each pattern, compute the Fourier transformed data and process it using the range profile information from step 3.
7. Construct the matrix C from the binary SLM patterns.
8. Spatially process the transformed data from step 6 using the matrix C from step 7 to reconstruct the depth map D associated with the rectangular facet. The depth map will contain information about the position, orientation, and shape of the planar facet.

The procedure described in the preceding paragraph is extended to natural scenes that have texture and reflectance variation along with depth variation by modifying the spatial processing in step 8 to estimate scene reflectance and texture, in at least one embodiment, this is accomplished by incorporating additional variables corresponding to reflectance and texture variation in the optimization procedure used to reconstruct spatial information. In some other embodiments, scene reflectance and texture is compensated through the use of gray scale SLM patterning to illuminate darker scene regions with more light power and lighter regions with lesser light power. Scene depth, texture, and reflectance information may also be estimated or compensated for using additional sensor information (if available), such as using two-dimensional RGB image.

In some embodiments described above, parametric signal deconvolution is employed to process captured image data to estimate a scene impulse response. The following steps describe a signal processing procedure that may be used for estimating scene impulse response from digital samples of the detector(s) impulse response and digital samples collected at the detector(s) output.
1. Input K digital samples from the detector, denoted by y$_1$, y$_2$, y$_3$ ..., y$_k$.
2. Compute an N point Fourier transform (N>K) of y$_1$, ... y$_k$. Denote the transformed data as
3. Compute the N point Fourier transform of the detector impulse response. Denote the transformed data as H$_1$, ..., H$_N$.
4. Choose an appropriate interpolation kernel based on the kind of scene being imaged. If the scene to be imaged is mostly comprised of planar objects, then a linear interpolation kernel is appropriate. If there are curved objects in the scene, a higher order kernel like splines may be used. Denote the Fourier coefficients of the interpolation kernel as $G_1, \ldots, G_N$.

5. Rescale each of the N coefficients $Y_1, \ldots, Y_N$ by their corresponding value of $H_1, \ldots, H_N$ and $G_1, \ldots, G_N$. Denote the rescaled data as $Z_1, \ldots, Z_N$.

6. Use $Z_1, \ldots, Z_N$ to estimate the number of discontinuities (or kinks) in the scene impulse response. In at least one embodiment, this was accomplished by forming a structured Hankel matrix using $Z_1, \ldots, Z_N$ followed by computing the rank of the matrix using singular value decomposition. Denote the number of discontinuities in scene impulse by L. Note that by the definition of matrix rank, L<N.

7. Use the computed value of L along with rescaled data $Z_1, \ldots, Z_N$ to compute the positions of discontinuities in the scene impulse response. In at least one embodiment, this may be accomplished by forming a structured Hankel matrix, H, of size (N−K+1×L+1) and computing the smallest eigenvector of H to be as the coefficients of the polynomial whose roots are the estimates for the positions of kinks in the scene impulse response. Denote these L kink position estimates as $d_1, \ldots, d_L$. Other methods to estimate kink positions in the scene impulse response may alternatively be employed. These methods are based on spectral estimation techniques.

8. Once the L kink locations are identified, the amplitudes of these kinks may be estimated using the data $Z_1, \ldots, Z_N$ and $d_1, \ldots, d_L$. In at least one embodiment, this may be accomplished using a fast implementation of linear Vandermonde filtering operation. Other techniques may alternatively be used. Denote the amplitude estimates $A_1, \ldots, A_L$.

9. Use the estimates $d_1, \ldots d_L$ and $A_1, \ldots, A_L$ along with the interpolation kernel G, to produce an estimate of the scene impulse response.

The depth and reflectance estimation procedures described above may be extended to scenes having curved objects or a combination of curved and planar objects by, for example, modifying item 4 in the previous paragraph to use higher order interpolation kernels, such as splines, to estimate the scene impulse response of scenes with curved objects. Once the scene impulse response is estimated, the spatial processing procedure is used to recover the shape and positions of the curved objects and planar surfaces.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A machine implemented imaging method for generating depth information for a three dimensional scene, the method comprising:
    transmitting light toward the scene;
    receiving reflected light at at least one detector resulting from reflection of the transmitted light from the scene;
    spatially modulating the light before it reaches the at least one detector using a number of different spatial modulation patterns;
    converting output signals of the at least one detector corresponding to different spatial modulation patterns to digital samples;
    processing digital samples corresponding to different spatial modulation patterns to estimate a number of scene impulse responses; and
    processing the scene impulse responses to generate a depth map for the scene;
    wherein processing digital samples includes:
        processing digital samples corresponding to a first spatial modulation pattern to estimate minimum and maximum depths associated with the scene wherein: the first spatial modulation pattern is a fully transparent pattern; and
        processing digital samples corresponding to other spatial modulation patterns using the minimum and maximum depths.

2. The method of claim 1, wherein:
the intensity of transmitted light or at least one spatial modulation pattern depends on the result of processing of digital samples corresponding to at least one previous spatial modulation pattern.

3. The method of claim 1, wherein:
spatially modulating the light before it reaches the at least one detector using a number of different spatial modulation patterns includes modulating the light using pseudo-randomly generated spatial light modulation patterns.

4. The method of claim 1, wherein:
transmitting light includes transmitting light from a single stationary source.

5. The method of claim 1, wherein:
the at least one detector includes fewer detectors than the number of array elements of the resulting depth map.

6. The method of claim 1, wherein:
the at least one detector includes a single detector.

7. The method of claim 1, wherein:
spatially modulating the light is performed before the light reaches the scene.

8. The method of claim 1, wherein:
spatially modulating the light is performed after the light is reflected from the scene.

9. The method of claim 1, wherein:
processing digital samples corresponding to different spatial modulation patterns includes deconvolving each set of digital samples using an impulse response of the at least one detector.

10. The method of claim 1, wherein:
processing digital samples corresponding to different spatial modulation patterns includes performing parametric signal deconvolution.

11. An imaging device comprising:
    a light source to generate light to illuminate a three dimensional scene of interest;
    at least one detector to detect light reflected from the scene of interest;
    a spatial light modulator to modulate the light before it reaches the at least one detector using a number of different spatial modulation patterns;
    an analog to digital converter (ADC) to digitize output signals of the at least one detector to generate digital samples corresponding to different spatial modulation patterns; and
    at least one digital processor to:
        process digital samples corresponding to different spatial modulation patterns to estimate a number of scene impulse responses; and
        process the scene impulse responses to generate a depth map for the scene of interest; and wherein the at least one digital processor is configured to process digital samples corresponding to a first spatial modulation pattern to estimate minimum and maximum image depths associated with the scene of interest, wherein the minimum and maximum image depths associated with the scene of interest are used to process digital samples corresponding to other spatial modulation patterns and wherein:
the first spatial modulation pattern is a fully transparent pattern.

12. The imaging device of claim 11, wherein:
the spatial light modulator is to modulate the light using pseudo randomly generated spatial modulation patterns.

13. The imaging device of claim 11, wherein:
the at least one detector includes fewer detectors than are needed to represent the level of spatial resolution of the resulting depth map.

14. The imaging device of claim 11, wherein:
the at least one detector includes a single photodetector.

15. The imaging device of claim 11, wherein:
the at least one detector includes an avalanche photodiode.

16. The imaging device of claim 11, wherein:
the light source includes a single light emitting element.

17. The imaging device of claim 11, wherein:
the spatial light modulator comprises a digital micromirror device.

18. The imaging device of claim 11, wherein:
the spatial light modulator comprises a liquid crystal spatial light modulator.

19. The imaging device of claim 11, further comprising:
one or more optical elements to process the light as it travels between the light source and the at least one detector.

20. The imaging device of claim 11, wherein:
the imaging device is part of a portable wireless communication device.

21. The imaging device of claim 11, wherein:
the imaging device is part of a device that receives inputs from a user or displays information to a user.

22. The imaging device of claim 11, wherein:
the spatial light modulator is located proximate to an output of the light source to modulate the light before it reaches the scene of interest.

23. The imaging device of claim 11, wherein:
the spatial light modulator is located proximate to an input of the at least one detector to modulate the light after it has been reflected from the scene of interest.

24. The imaging device of claim 11, wherein:
the at least one digital processor is configured to process digital samples corresponding to a spatial modulation pattern by deconvolving the digital samples using an impulse response of the at least one detector.

25. The imaging device of claim 11, wherein:
the at least one digital processor is configured to process digital samples corresponding to a spatial modulation pattern using parametric signal deconvolution.

* * * * *